United States Patent
Denton et al.

(10) Patent No.: US 10,351,974 B2
(45) Date of Patent: Jul. 16, 2019

(54) FEEDSTOCKS FOR FORMING CARBON ALLOTROPES

(71) Applicants: ExxonMobil Upstream Research Company, Houston, TX (US); Solid Carbon Products LLC, Provo, UT (US)

(72) Inventors: Robert D. Denton, Houston, TX (US); Dallas B. Noyes, Provo, UT (US); Russell J. Koveal, Jr., Baton Rouge, LA (US); Terry A. Ring, Sandy, UT (US)

(73) Assignees: EXXONMOBIL UPSTREAM RESEARCH COMPANY, Houston, TX (US); SOLID CARBON PRODUCTS, LLC, Provo, UT (US)

( * ) Notice: Subject to any disclaimer, the term of this patent is extended or adjusted under 35 U.S.C. 154(b) by 912 days.

(21) Appl. No.: 14/395,434

(22) PCT Filed: Apr. 10, 2013

(86) PCT No.: PCT/US2013/035976
§ 371 (c)(1),
(2) Date: Oct. 17, 2014

(87) PCT Pub. No.: WO2013/158437
PCT Pub. Date: Oct. 24, 2013

(65) Prior Publication Data
US 2015/0071848 A1 Mar. 12, 2015

Related U.S. Application Data

(60) Provisional application No. 61/625,669, filed on Apr. 17, 2012, provisional application No. 61/625,665, filed on Apr. 17, 2012.

(51) Int. Cl.
*D01F 9/12* (2006.01)
*D01F 9/127* (2006.01)
(Continued)

(52) U.S. Cl.
CPC .............. *D01F 9/12* (2013.01); *B01J 8/1836* (2013.01); *C01B 32/152* (2017.08); *C01B 32/16* (2017.08);
(Continued)

(58) Field of Classification Search
None
See application file for complete search history.

(56) References Cited

U.S. PATENT DOCUMENTS 2,796,331 A  6/1957  Kauffman et al.
3,771,959 A * 11/1973  Fletcher .............. B01D 53/62
                                                128/205.28
(Continued)

FOREIGN PATENT DOCUMENTS

JP  10-182121 A   7/1998
JP  2002-068720 A  3/2002
(Continued)

OTHER PUBLICATIONS

Muscatello; Self-Cleaning Bouduard Reactor for Full Oxygen Recovery from CO2 Project; 2015.*
(Continued)

*Primary Examiner* — Guinever S Gregorio
(74) *Attorney, Agent, or Firm* — International IP Law Group, P.L.L.C.

(57) ABSTRACT

Methods and systems are provided for forming carbon allotropes. An exemplary method includes forming a feedstock that includes at least about 10 mol % oxygen, at least about 10 mol % carbon, and at least about 20 mol % hydrogen. Carbon allotropes are formed from the feedstock
(Continued)

in a reactor in a Bosch reaction at a temperature of at least about 500° C., and the carbon allotropes are separated from a reactor effluent stream.

33 Claims, 13 Drawing Sheets

(51) Int. Cl.
  *B01J 8/18* (2006.01)
  *C01B 32/152* (2017.01)
  *C01B 32/16* (2017.01)
(52) U.S. Cl.
  CPC ..... *D01F 9/127* (2013.01); *B01J 2208/00876* (2013.01); *Y02P 20/129* (2015.11)

(56) References Cited

U.S. PATENT DOCUMENTS

| | | |
|---|---|---|
| 7,585,483 B2 | 9/2009 | Edwin et al. |
| 8,679,444 B2 | 3/2014 | Noyes |
| 2003/0111410 A1 | 6/2003 | Branson |
| 2005/0074392 A1 | 4/2005 | Yang et al. |
| 2007/0025906 A1 | 2/2007 | Pirard et al. |
| 2007/0253886 A1 | 11/2007 | Abatzoglou et al. |
| 2008/0274277 A1 | 11/2008 | Rashidi et al. |
| 2010/0050639 A1 | 3/2010 | Janus et al. |
| 2010/0316556 A1 | 12/2010 | Wei et al. |
| 2011/0289924 A1 | 12/2011 | Pietsch |
| 2012/0034150 A1 | 2/2012 | Noyes |

FOREIGN PATENT DOCUMENTS

| | | |
|---|---|---|
| JP | 2004-360099 A | 12/2004 |
| WO | WO2007047063 A2 | 4/2007 |
| WO | WO/2010/120581 A1 | 10/2010 |
| WO | WO2013/090444 A1 | 6/2013 |

OTHER PUBLICATIONS definition effluent; Merriam Webster; Oct. 22, 2017.*
King et al.; A Carbon Dioxide Reduction Unit Using Bosch Reaction and Expendable Catalyst Cartridges; NASA Contractor Report; Nov. 1970.*
Japanese Non-Final Office Action, JP Application No. 2015-532066 dated Jun. 23, 2017, 4 pages (Related Case).
Karthikeyan, et al., Large Scale Synthesis of Carbon Nanotubes. E-Journal of Chemistry, 2009, 6(1), 1-12.
PCT International Search Report, dated Aug. 9, 2013, for PCT Application PCT/US13/35976, Filed Apr. 10, 2013.
Vander Wal, R.L., et al., Flame Synthesis of Single-Walled Carbon Nanotubes and Nanofibers. Seventh International Workshop on Microgravity Combustion and Chemically Reacting Systems, Aug. 2003, 73-76 (NASA Research Publication: NASA/CP-2003-212376/REV1).
Written Opinion of the International Searching Authority, dated Aug. 9, 2013, for PCT Application PCT/US13/35976, Filed Apr. 10, 2013.

* cited by examiner

100

400

800

1100

1300

FEEDSTOCKS FOR FORMING CARBON ALLOTROPES

CROSS REFERENCE TO RELATED APPLICATIONS

Pursuant to 35 U.S.C. § 371, this application is a United States National Stage Application of International Patent Application No. PCT/US2013/035976, filed on 10 Apr. 2013, which claims priority based on U.S. Provisional Application Ser. No. 61/625,669, filed 17 Apr. 2012, titled "Feedstocks For Forming Carbon Allotropes" and U.S. Provisional Application Ser. No. 61/625,665, filed 17 Apr. 2012, titled "Carbonaceous Feedstocks For Forming Carbon Allotropes" the contents of which are incorporated by reference as if set forth in their entirety herein. The previous provisional applications are related to U.S. patent application Ser. No. 13/263,311 by Noyes and titled "Method for Producing Solid Carbon by Reducing Carbon Oxides," which was filed 6 Oct. 2011, which claims priority based on International Patent Application Number PCT/US2010/029934, by Noyes, entitled "Method for Producing Solid Carbon by Reducing Carbon Oxides," which was filed on 5 Apr. 2010, which in turn claims priority based on U.S. Provisional Patent Application Ser. No. 61/170,199 filed 17 Apr. 2009 and titled "Method for Producing Solid Carbon by Reducing Carbon Oxides," the disclosures of all of which are incorporated herein by this reference.

FIELD

The present techniques relate to an industrial scale process for forming carbon fibers and carbon nanomaterials. Specifically, the techniques described herein talk about feedstock compositions that can be used to form carbon allotropes.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon, e.g., carbon allotropes, have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils. Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recently, allotropes of carbon, such as fullerenes, have been developed, and are starting to be developed in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to the use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan, et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/min. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors, is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman et al. (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L., et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP—2003-212376/REV1). The technique used the introduction of a CO or $CO/C_2H_2$ mixture into a flame along with a catalyst to form the carbon nanotubes. The authors noted the high productivity that could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 milliseconds.

International Patent Application Publication WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions and optional additives used in the reduction reaction.

SUMMARY

An embodiment provided herein provides a method for forming carbon allotropes The method includes forming a feedstock that includes at least about 10 mol % oxygen, at least about 10 mol % carbon, and at least about 20 mol hydrogen. The method also includes forming carbon allotropes from the feedstock in a reactor in a Bosch reaction at a temperature of at least about 500° C., and separating the carbon allotropes from a reactor effluent stream.

Another embodiment provides a system for the production of carbon allotropes that includes a feedstock including at least about 10 mol % oxygen, at least about 10 mol % carbon, and at least about 20 mol % hydrogen. A feed gas heater is configured to heat the feedstock with waste heat from a waste gas stream. A reactor is configured to form carbon allotropes from the feedstock in a Bosch reaction. A separator is configured to separate the carbon allotropes from the reactor effluent stream forming the waste gas stream, and a water removal system, including an ambient temperature heat exchanger and separator is configured to separate the bulk of the water from the waste gas stream to form a dry waste gas stream.

Another embodiment provides a reaction system for forming carbon nanotubes. The reaction system includes two or more reactors configured to form carbon nanotubes from gas streams using a Bosch reaction, wherein a gas stream includes at least about 10 mol % oxygen, at least about 10 mol % carbon, and at least about 20 mol % hydrogen. An effluent from each reactor, before a final reactor, is used as a feed stream for a downstream reactor, and an effluent stream from the final reactor includes a reactant depleted waste stream. A separation system is disposed downstream of each reactor, wherein the separation system is configured to remove carbon nanotubes from the effluent from the reactor. A feed heater is disposed downstream of each separation system, wherein the feed heater includes a heat exchanger configured to heat a feed gas stream for a following reactor using waste heat from the effluent from the reactor. The feed heater downstream of the final reactor is configured to heat a gas stream for the first reactor. An ambient temperature heat exchanger is disposed downstream of each feed heater, wherein the ambient temperature heat exchanger is configured to remove water from the effluent, forming the feed stream for the following reactor. A compressor is configured to increase the pressure of the reactant depleted waste stream and an ambient temperature heat exchanger downstream of the compressor is configured to remove water from the reactant depleted waste stream. A gas fractionation system is configured to separate the reactant depleted waste stream into a methane enriched stream and a carbon dioxide enriched stream and a mixer configured to blend the methane enriched stream or the carbon dioxide enriched stream into an initial feed stream.

DESCRIPTION OF THE DRAWINGS

The advantages of the present techniques are better understood by referring to the following detailed description and the attached drawings, in which.

DETAILED DESCRIPTION

Figure 1:
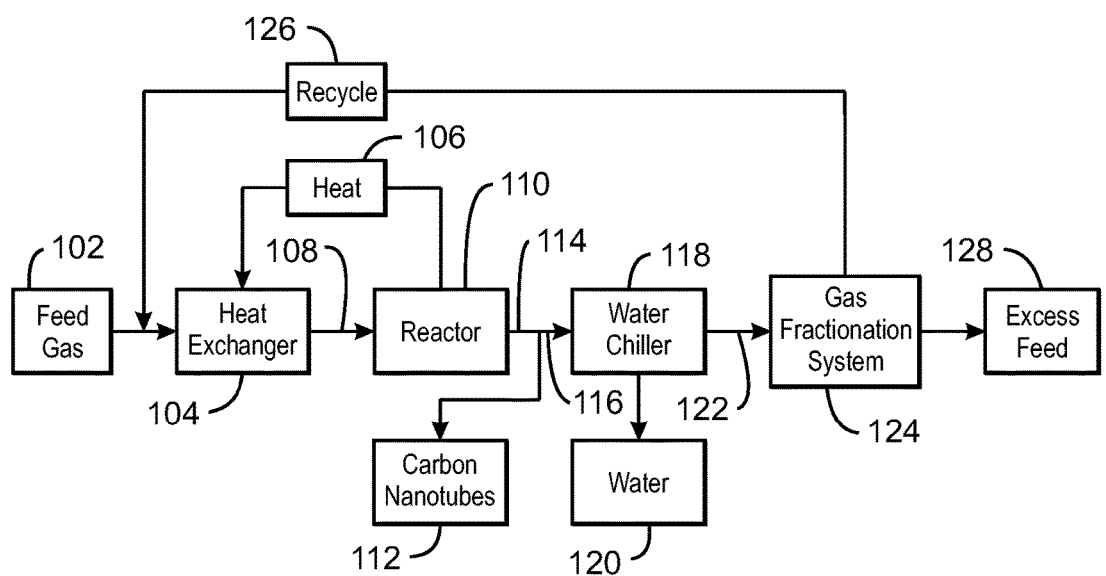
FIG. 1 is a block diagram of a reaction system that generates carbon allotropes, for example, as a by-product of a carbon dioxide sequestration reaction.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "Buckminster fullerene." The walls of the carbon nanotubes are formed from sheets of carbon in a graphene structure. As used herein, nanotubes may include single wall nanotubes and multiple wall nanotubes of any length. It can be understood that the term "carbon allotropes" as used herein and in the claims, includes all allotropes of carbon, such as carbon fibers, carbon nanofibers, other carbon nanostructures, as well as graphite, amorphous carbon and other structures.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

An "oxygenate," as used herein, is a compound that primarily contains carbon, hydrogen, and oxygen. Oxygenates can include alcohols, aldehydes, ketones, carboxylic acids, carbohydrates, and other organic compounds that contain oxygen.

Overview

Embodiments described herein provide systems and methods for making carbon allotropes, such as carbon fibers, nanofibers, and nanotubes (CNTs), on an industrial scale. The carbon allotropes can be made using feedstocks that include nearly mixtures of carbon oxides, hydrocarbons, oxygenates, and methane, among others. In some embodiments, the feedstocks are higher in hydrocarbons, such as $CH_4$, while in other embodiments, the feedstocks are higher in carbon oxides, such as $CO_2$. Further, any number of other hydrocarbon and oxygenated feedstocks may be used, including alkanes, alkenes, alkynes, alcohols, ketones, aldehydes, carboxylic acids, and $H_2O$, among many others. Any combinations of these components may be used, wherein the feedstock will generally have the elements C, H, and O. The mole ratios of elements in the feedstocks may vary, generally including materials or mixtures that have a 1:1 ratio of carbon to oxygen and a 2:1 ratio of hydrogen to oxygen. For example, a feedstock formed may be a mixture of $CO_2$ and $CH_4$, which has a mole ratio of 2C:2O:4H or 1:1:2. These ratios are merely exemplary, and any number of other elemental ratios may be used. Generally, the mole ratio of carbon in the feedstock 112 may be higher than the mole ratio of oxygen, e.g., greater than 1:1, and the mole ratio of hydrogen may be greater than twice the mole ratio of oxygen, e.g., greater than 2:1.

The process may be slightly exothermic, energy neutral, or slightly endothermic. Accordingly, at least a portion of the heat from the reaction can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. After separation of the product and water formed during the reaction, a gas fractionation system is used to separate any remaining amounts of the limiting reagent from a waste gas mixture and recycle this reagent to the process.

As used herein, an ambient temperature heat exchanger can include water chillers, air coolers, or any other cooling system that exchanges heat with a source that is at substantially ambient temperature. It can be understood that ambient temperature is substantially the temperature of the outside air at the location of the facility, e.g., ranging from about −40° C. to about +40° C., depending on the location of the facility. Further, different types of ambient temperature heat exchangers may be used depending on current ambient temperature. For example, a facility that uses water chillers in a summer season may use air coolers in a winter season. It can be understood that an appropriate type of heat exchanger may be used at any point herein that describes the use of an ambient temperature heat exchanger. The ambient temperature heat exchangers may vary in type across the plant depending on the amount of cooling needed.

Embodiments described herein can be used to produce industrial quantities of carbon allotropes, such as fullerenes, carbon nanotubes, carbon nanofibers, carbon fibers, graphite, carbon black, and graphene, among others, using carbon oxides as a carbon source. The balance of the possible products may be adjusted by the conditions used for the reaction, including catalyst compositions, temperatures, pressures, feedstocks, and the like. In a reactor system, the carbon oxides are catalytically converted to solid carbon and water. The carbon oxides may be obtained from numerous sources, including the atmosphere, combustion gases, process off-gases, well gas, and other natural and industrial sources.

As an example, the process may use feedstocks that include a carbon oxide, e.g., carbon dioxide ($CO_2$) or carbon monoxide (CO), and a reducing agent, e.g., methane ($CH_4$) or other hydrocarbons, hydrogen ($H_2$), or combinations thereof. The reducing agent may include other hydrocarbon gases, hydrogen ($H_2$), or mixtures thereof. A hydrocarbon gas, or an oxygenate, can act as both an additional carbon source and as the reducing agent for the carbon oxides. Other gases, such as syngas, may be created as intermediate compounds in the process or may be contained in the feed. These gases can also be used as the reducing agent. Syngas, or "synthetic gas," includes carbon monoxide (CO) and hydrogen ($H_2$) and, thus, includes both a carbon oxide and a reducing gas in a single mixture. Syngas may be used as all or portion of the feed gas.

Carbon oxides, particularly carbon dioxide, are abundant gases that may be extracted from exhaust gases, low-BTU well gas, and from some process off-gases. Although carbon dioxide may also be extracted from the air, other sources often have much higher concentrations and are more economical sources from which to harvest the carbon dioxide. Further, carbon dioxide is available as a by-product of power generation. The use of $CO_2$ from these sources may lower the emission of carbon dioxide by converting a portion of the $CO_2$ into carbon products.

The systems described herein may be incorporated into power production and industrial processes for the sequestration of carbon oxides, allowing their conversion to solid carbon products. For example, the carbon oxides in the combustion or process off-gases may be separated and concentrated to become a feedstock for this process. In some cases these methods may be incorporated directly into the process flow without separation and concentration, for example as an intermediate step in a multi-stage gas turbine power station.

As used herein, an industrial scale process may provide large quantities of carbon allotropes in short periods of time. For example, the techniques used herein may provide carbon allotropes in quantities greater than about 0.5 Kg/hr, greater than about 1 Kg/hr, greater than about 2 Kg/hr, greater than about 5 Kg/hr, greater than about 10 Kg/hr, greater than about 100 Kg/hr, or greater than 1000 Kg/hr. The amounts produced depend on the scale of the equipment and the catalysts chosen.

FIG. 1 is a block diagram of a reaction system 100 that generates carbon allotropes, for example, as a by-product of a carbon dioxide sequestration reaction. The reaction system 100 is provided a feed gas 102, which can be a mixture of $CO_2$ and $CH_4$, among others. In some embodiments, the reaction may allow for sequestration of $CO_2$ from exhaust streams of power plants and the like. In other embodiments, the $CH_4$ is at a higher concentration, for example, in a gas stream from a natural gas field. Other components may be present in the feed gas 102, such as $C_2H_6$, $C_2H_4$, oxygenates, and the like. In one embodiment, the feed gas 102 has been treated to remove these components, for example, for sale as product streams.

The feed gas 102 is passed through a heat exchanger 104 to be heated for reaction. During continuous operation, a portion of the heating is provided using heat 106 recovered from the reaction. The remaining heat for the reaction may be provided by an auxiliary heater, as described below. During start-up, the auxiliary heater is used to provide the total heat to bring the feed to the appropriate reaction temperature, e.g., about 500° C. (about 930° F.). In one embodiment, the feed is heated to between about 500° C. (about 932° F.) to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.). The heated feed gas 108 is fed to a reactor 110.

In the reactor 110, a catalyst reacts with a portion of the heated feed gas 108 to form carbon allotropes, such as carbon nanotubes 112, using the Bosch reaction or Bosch like reactions (reverse degasification). As described in more detail below, the reactor 110 can be a fluidized bed reactor that uses any number of different catalysts, including, for example, metal shot, supported catalysts, and the like. The carbon nanotubes 112 are separated from the flow stream 114 out of the reactor 110, leaving a waste gas stream 116 containing excess reagents and water vapor. At least a portion of the heat from the flow stream 114 is used to form the heated feed gas 108 prior to the flow stream 114 entering the chiller as waste gas stream 116.

The waste gas stream 116 is passed through an ambient temperature heat exchanger, such as water chiller 118, which condenses out the water 120. The resulting dry waste gas stream 122 is used as a feed stream for a gas fractionation system 124. It can be understood that a dry waste gas stream 122, as used herein, has the bulk of the water removed, but may still have small amounts of water vapor. For example, the dew point of a dry waste gas stream 122 may be greater than about −5° C., greater than about 0° C., greater than about 5° C., greater than about 10° C., or greater than about 20° C., or higher. A dryer may be used to lower the dewpoint, for example, to about −50° C., about −70° C., or lower, prior to gas fractionation.

The gas fractionation system 124 removes a portion of the reagent having the lower concentration in the feed gas 102 and recycles it to the process, for example, by blending a recycle stream 126 with the feed gas 102. The higher concentration gas in the feed gas 102 can be disposed of as excess feed 128, for example, by sales to downstream users. As an example, if $CO_2$ is the highest concentration gas in a blend with $CH_4$, the gas fractionation system 124 can be used to remove $CH_4$ remaining in the waste gas stream, and send it back into the process as recycle 126. The process functions as an equilibrium reaction between the reagents and solid carbon, as discussed further with respect to FIG. 9. The gas fractionation system 124 may not be needed when the $CH_4$ is in excess, as much of the $CO_2$ may be consumed in the reaction. Thus, the excess feed 128 that contains the $CH_4$, and which may also contain $H_2$, CO, and other gases, may be used to generate power in a power plant without further purification or gas separation. Further, a portion of this excess feed 128 may be recycled without further treatment or fractionation.

Reactor Systems

Figure 2:
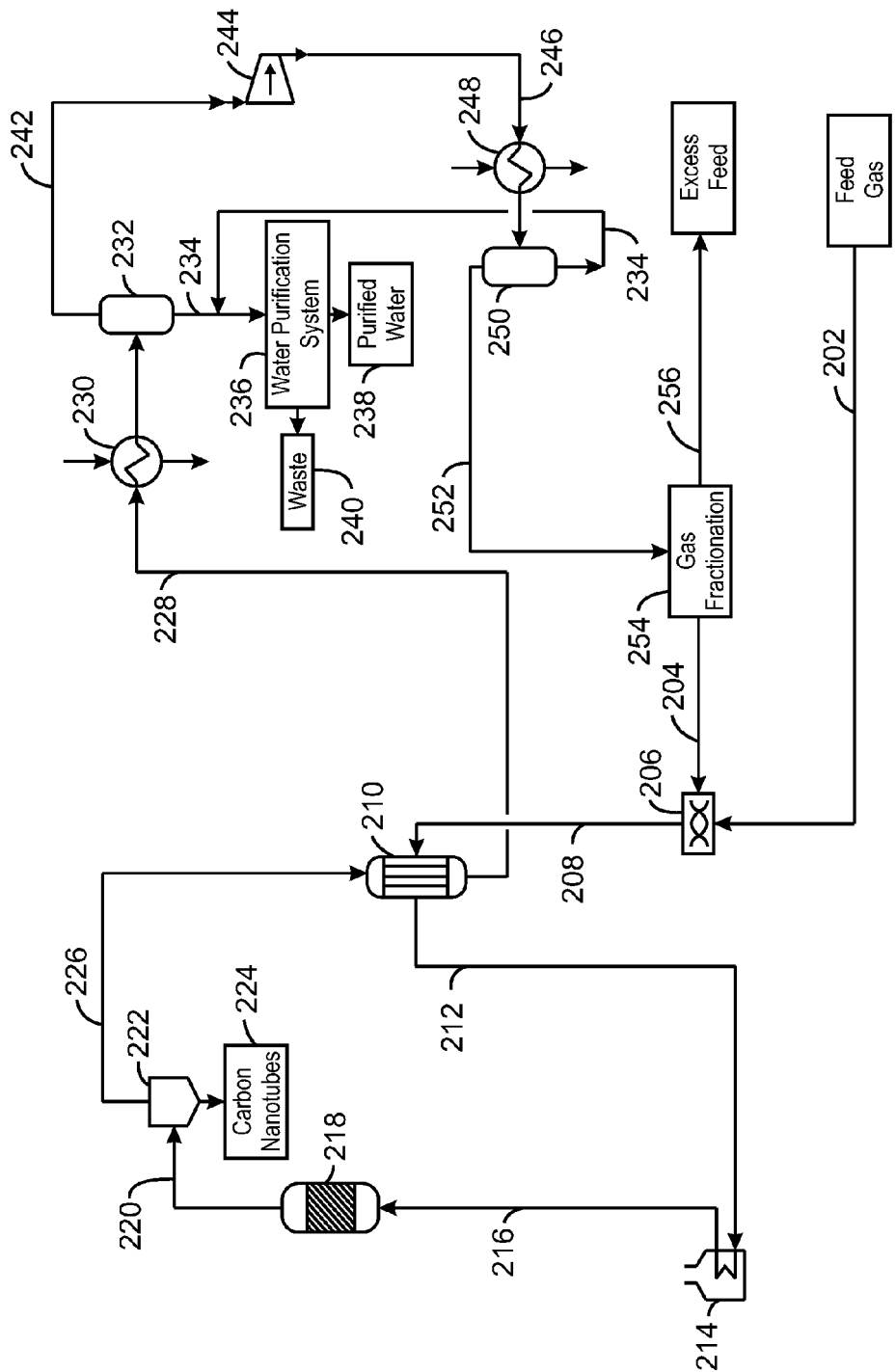
FIG. 2 is a simplified process flow diagram of a one reactor system for making carbon allotropes from a gas feed that includes carbon dioxide and methane.

FIG. 2 is a simplified process flow diagram of a one reactor system 200 for making carbon allotropes from a gas feed that includes carbon dioxide and methane. As shown, the one reactor system 200 can be used for feed gas 202 that is higher in $CO_2$ or higher in $CH_4$. In the reaction system 200, the feed gas 202 is combined with a recycle gas 204 that has an enhanced concentration of the lesser gas. The mixing can be performed using a static mixer 206.

The combined gas stream 208 is passed through a heat exchanger 210 to be heated by a reactor effluent stream. The temperature can be raised from a near ambient temperature, as defined herein, to an appropriate reaction temperature, such as about 500° C. (930° F.), about 750° C. (about 1382° F.), about 850° C. (about 1562° F.), or about 950° C. (about 1742° F.), for the heated gas stream 212. This temperature may be sufficient for maintaining the reaction during continuous operations. However, part of the heat may be provided by a package heater 214, which may be especially useful for adding heat to bring the reactants up to temperature during start-up. The hot gas stream 216 is then introduced into a fluidized bed reactor 218. A general fluidized bed reactor that may be used in embodiments is discussed with respect to FIG. 7. The feedstocks are not limited to gaseous feedstock, but may include liquid feedstocks that are vaporized and injected directly into the fluidized bed reactor 218.

The carbon allotropes are carried from the fluidized bed reactor 218 in a reactor effluent stream 220. The reactor effluent stream 220, for example, about 600° C. (about 1112° F.), about 700° C. (about 1292° F.), about 800° C. (about 1472° F.), or about 900° C. (about 1652° F.), and may be cooled by exchanging heat with the combined gas stream 208, for example, providing some or all of the heat used to heat the reactants. Either prior to or after cooling, the reactor effluent stream 220 is passed through a separation device 222, such as a cyclonic separator, to remove the carbon allotropes, such as CNTs 224. The resulting waste gas stream 226 can used to provide heat to the combined gas stream 208 in the heat exchanger 210. The carbon allotropes may also be removed in secondary separation devices (not shown) at lower temperatures than the waste gas stream 226.

After providing heat to the combined gas stream 208, the cooled waste stream 228 is passed through an ambient temperature heat exchanger 230 and then fed to a separation vessel 232. Water 234 settles in the separation vessel 232 and is removed from the bottom. The water 234 may then be fed into a water purification system 236. The water purification system 236 may produce a purified water stream 238, as well as a waste stream 240.

The water purification system 236 may be used to remove carbon allotropes from the cooled waste stream 228 through a number of separation techniques. In various embodiments, the water purification system 236 may be configured to produce a carbon oxide from the carbon allotropes within the water 234. In some embodiments, an air sparging process may be used to effect a separation of the carbon allotropes from the water 234.

The resulting gas stream 242 from the separation vessel 232 may be significantly cooler, for example, at about 30° C., about 38° C. (about 100° F.), about 40° C. and at a pressure of about 2500, kiloPascals (kPa), about 3000 kPa, about 3720 kPa (about 240 psia), or about 4000 kPa. In one embodiment, the gas is then dried to a low dew point in a drier (not shown). The stream enters a compressor 244 that increases the pressure of the gas stream 242, for example, to about 5000 kPa, about 6000 kPa, about 7000 kPa, about 7,240 kPa (about 1050 psia), or about 8000 kPa, forming a high pressure stream 246 which is passed through another ambient temperature heat exchanger 248. From the ambient temperature heat exchanger 248, the high pressure stream 246 is fed to a separation vessel 250 for removal of any remaining water 234, for example, if a drier has not been used. As shown in FIG. 2, the water 234 may be combined with the water 234 from the separation vessel 232 and fed into the water purification system 236.

In embodiments in which the $CO_2$ is in excess in the feed gas 202, the dried gas stream 252 can be sent to a gas fractionation system 254, which separates the excess feed 256 from the recycle gas 204. In reaction systems 200 based on a proportionate excess of $CO_2$, the excess feed 256 may primarily include $CO_2$, and the recycle gas 204 may primarily include $CH_4$. In reaction systems 200 based on a proportionate excess of $CH_4$, the excess feed 256 will not have a substantial $CO_2$ content, and a portion may be recycled without further purification, for example, replacing the gas fractionation system 254 with a manifold. In some embodiments, a portion of the excess feed 256, the recycle gas 204, or both may be used to provide a fuel gas stream, a purge gas stream, or both for use in the plant, as shown in FIG. 3.

Figure 3:
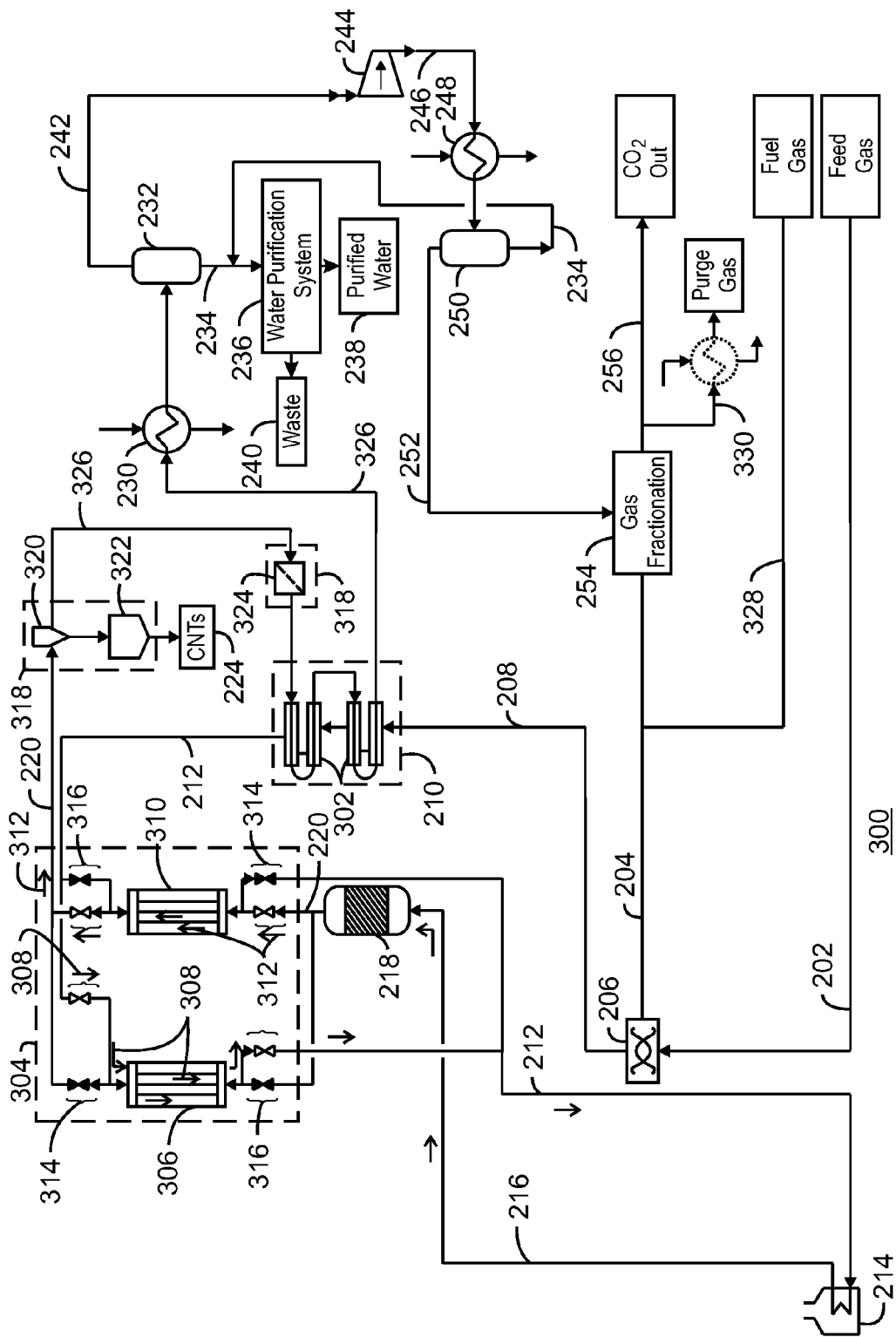
FIG. 3 is another simplified process flow diagram of a one reactor system for making CNTs from a gas feed that includes carbon dioxide and methane, in which the carbon dioxide is in excess.

FIG. 3 is another simplified process flow diagram of a one reactor system 300 for making CNTs from a gas feed that includes carbon dioxide and methane, in which the carbon dioxide is in excess. In FIG. 3, like number items are as described with respect to FIG. 2. As described with respect to FIG. 2, the feed gas 202 passes through a static mixer 206 where it is combined with recycle gas 204, which is high in methane. The combined gas stream 208 is passed through a heat exchanger 210, for example, including multiple shell and tube heat exchangers 302. The main difference between the more detailed process flow diagram of FIG. 3 and that of FIG. 2 is the use of heat exchangers to cool the reactor effluent stream 220 prior to separating the carbon allotropes from the reactor effluent stream 220.

In this embodiment, the heated gas stream 212 is raised to a temperature of about 300° C., about 400° C., about 427° C. (about 800° F.), or about 500° C. in the heat exchanger 210 prior to flowing through a second heat exchanger 304. In the second heat exchanger 304, the heated gas stream 212 flows through a first ceramic block heat exchanger 306, as indicated by arrows 308. Heat stored in the first ceramic block heat exchanger 306 is exchanged to the heated gas stream 212 and may increase the temperature to between about 500° C. (about 932° F. and to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.).

While the first ceramic block heat exchanger 306 is used to heat the heated gas stream 212, a second ceramic block heater 310 is used to cool the reactor effluent stream 220 by flowing this stream through the second ceramic block heater 310, as indicated by arrows 312. When the second ceramic block heat exchanger 310 reaches a selected temperature, or the first ceramic block heat exchanger 306 drops to a selected temperature, the positions of the inlet valves 314 and outlet valves 316 are changed. In other words, open valves are closed and closed valves are opened. The change in the positions of the valves changes which ceramic block heat exchanger 306 or 310 is being heated by the flow from the reactor 218, as well as which ceramic block heat exchanger 306 or 310 is used to heat the heated gas stream 212. The heat exchangers 210 and 304 may also be used to vaporize a liquid feedstock in preparation for injection into the reactor 218. For example, a portion of each ceramic block heat exchanger 306 and 310 in the second heat exchanger 304 may have a flow path dedicated to flashing the liquid feedstock to a vapor.

The heat may not be sufficient to increase the temperature of the heated gas stream 212 sufficiently for reaction. Thus, as described with respect to FIG. 2, a package heater 214 can be used to further boost the temperature of the heated gas stream 212, forming the hot gas stream 216, which can be fed to the fluidized bed reactor 218. Carbon allotropes are formed in the fluidized bed reactor 218, and carried out in the reactor effluent stream 220.

After flowing through the second ceramic block heater 310, the reactor effluent 220 is flowed to a separation system 318, which is used to remove the carbon allotropes, such as CNTs 224, from the reactor effluent 220. In this embodiment, the separation system 318 for the carbon allotropes includes a cyclonic separator 320, a lock hopper 322, and a filter 324. After the majority of the carbon allotropes are removed by the cyclonic separator 320 and deposited into the lock hopper 322, the filter 324 is used to remove remaining carbon allotropes from the waste gas stream 326. This may help to prevent plugging, or other problems, caused by residual carbon allotropes in the waste gas stream 326. The filter 324 can include bag filters, sintered metal filters, and ceramic filters, among other types. From the separation system 318, the carbon allotropes, such as CNTs 224, may be directed to a packaging system. After the filter 324, the waste gas stream 326 is flowed through the heat exchanger 210 before flowing to the ambient temperature heat exchanger 230 and then fed to a separation vessel 232 for separation of the water 234. After flowing through the separation vessel 232, the flow is as described with respect to FIG. 2.

The individual streams 204 and 256 can be used to supply other gases for the process. For example, a fuel gas stream 328 may be removed from the high methane recycle gas 204 and used for powering turbines, boilers, or other equipment in order to provide power to the system 300 or to an electric grid. Further, a purge gas stream 330 may be removed from the $CO_2$ waste stream 256. The purge gas stream 330 may be used for cooling and purging the CNTs during packaging. The purge gas may also be used for various cleaning functions in the plant, such as blowing residual carbon allotropes out of a ceramic heat exchanger 306 or 310 when flow is reversed.

A similar plant configuration may be used for a high methane feed gas. In this case, however, a gas fractionation system may not be needed, as the resulting gas can be directly recycled without further treatment. Further, the recycle and effluent waste streams can contain substantial quantities of hydrogen and carbon monoxide, e.g., greater than about 1 mol % each, about 5 mol % each, about 10 mol % each, or about 20 mol % of each component. These components will generally be present in the feed and all non-$CO_2$ product streams, i.e., the recycle methane will always contain some CO and $H_2$.

Gas Fractionation System

Figure 4:
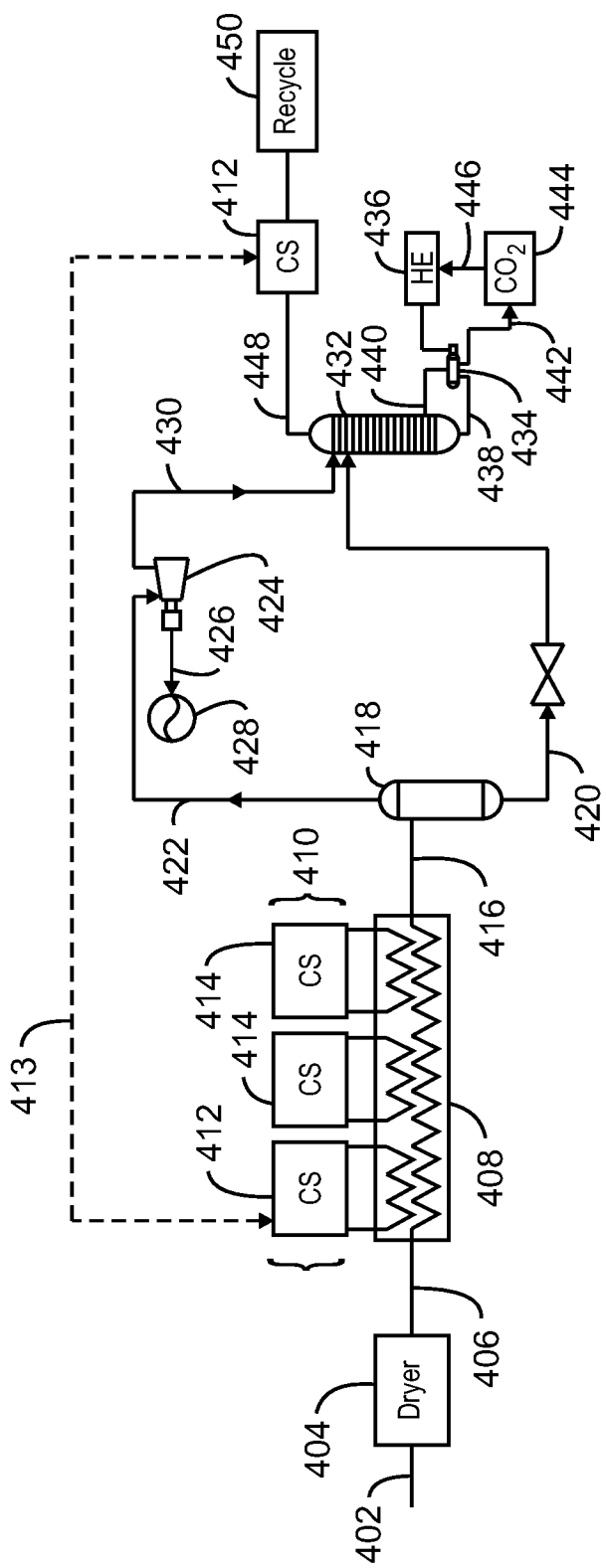
FIG. 4 is a simplified process flow diagram of a gas fractionation system that can be used in a reactor system for the production of carbon nanotubes.

FIG. 4 is a simplified process flow diagram of a gas fractionation system 400 that can be used in a reactor system for the production of carbon nanotubes. The gas fractionation system 400 is a bulk fractionation process that may be used with a high $CO_2$ reactor system, such as that discussed with respect to FIG. 3. Further, the gas fractionation system 400 may be used to purify a gas stream formed in a gassifier, to form a feedstock stream.

In the gas fractionation system 400, the feed gas 402 is fed to a dryer 404 to reduce the dew point to about −40° C., about −50° C., about −56.7° C. (about −70° F.), about −60° C., about −70° C., about −80° C., or lower. The feed gas 402 can correspond to the dried gas stream 252 discussed with respect to FIGS. 2 and 3. The dryer 404 can be a fixed or fluidized dryer bed, containing an adsorbent, such as molecular sieves, desiccants, and the like. Other dryer technologies may also be used, such as cryogenic drier systems. In some embodiments, the dryer can be located prior to the compressor 358, which may eliminate the need for the ambient temperature heat exchanger 362.

The dry gas feed 406 is then fed through a cryogenic chiller 408 to reduce the temperature in preparation for the separation. As $CO_2$ will condense from the gas at about −61° C. (about −77° F.), a multistage chilling system 410 may be used to reduce the temperature to around this level. The multistage chilling system 410 may include a heat recovery system 412 used to heat the outlet gas with energy 413 from the dry feed gas 406. The multistage chilling system 410 may also include other refrigerant systems 414, such as a medium pressure propane system or a high pressure propane system.

The chilled feed 416 is fed to a separation vessel 418 to separate a liquid stream 420 and a vapor stream 422. The vapor stream 422 is passed through an expander 424 to lower the temperature by generating mechanical work 426 in an adiabatic expansion process. In one embodiment, the mechanical work 426 is used to drive a generator 428, which may provide a portion of the electricity used in the plant. In another embodiment, the mechanical work 426 is used to drive a compressor, for example, for compressing a refrigerant stream for the multistage chilling system 410. The expansion can result in a two phase stream 430.

The liquid stream 420 and the two phase stream 430 are fed to a separation column 432, for example, at different points along the separation column 432. Heat is supplied to the separation column 432 by a reboiler 434. The reboiler 432 is heated by a stream from a heat exchanger 436. The heat exchanger 436 may be part of a chiller system that is warmer than the separation column 432, although below ambient temperature. The column bottom stream 438 is passed through the reboiler 434 and a portion 440 is reinjected after being warmed. An outlet stream 442 from the reboiler 434 provides the $CO_2$ product 444. A portion 446 of the $CO_2$ product 444 may be recycled through the heat exchanger 436 to carry energy to the reboiler 434.

The overhead stream 448 from the separation column 432 is a methane enhanced stream, for example, including about 55 mol % $CH_4$ and about 40 mol % $CO_2$, about 60 mol % $CH_4$ and about 35 mol % $CO_2$, about 70 mol % $CH_4$ and about 25 mol % $CO_2$, about 73 mol % $CH_4$ and about 23 mol % $CO_2$, or about 80 mol % $CH_4$ and about 15 mol % $CO_2$. As noted, the overhead stream 448 may be used in a chiller system 412 to cool the dry gas feed 406, warming the overhead stream 448 to form the recycle gas 450. Other components may be present in the recycle gas 450 including, for example, about 1 mol % CO and $H_2$, about 2 mol % CO and $H_2$, about 3.5 mol % CO and $H_2$, about 4 mol % CO and $H_2$, or about 5 mol % CO and $H_2$.

The configurations and units discussed with respect to FIG. 4 are merely exemplary. Any number of variations may be made to these systems. Further, other gas separation systems may be used in embodiments, so long as flow rates and purity levels can be achieved.

Reactor Systems

Figure 5:
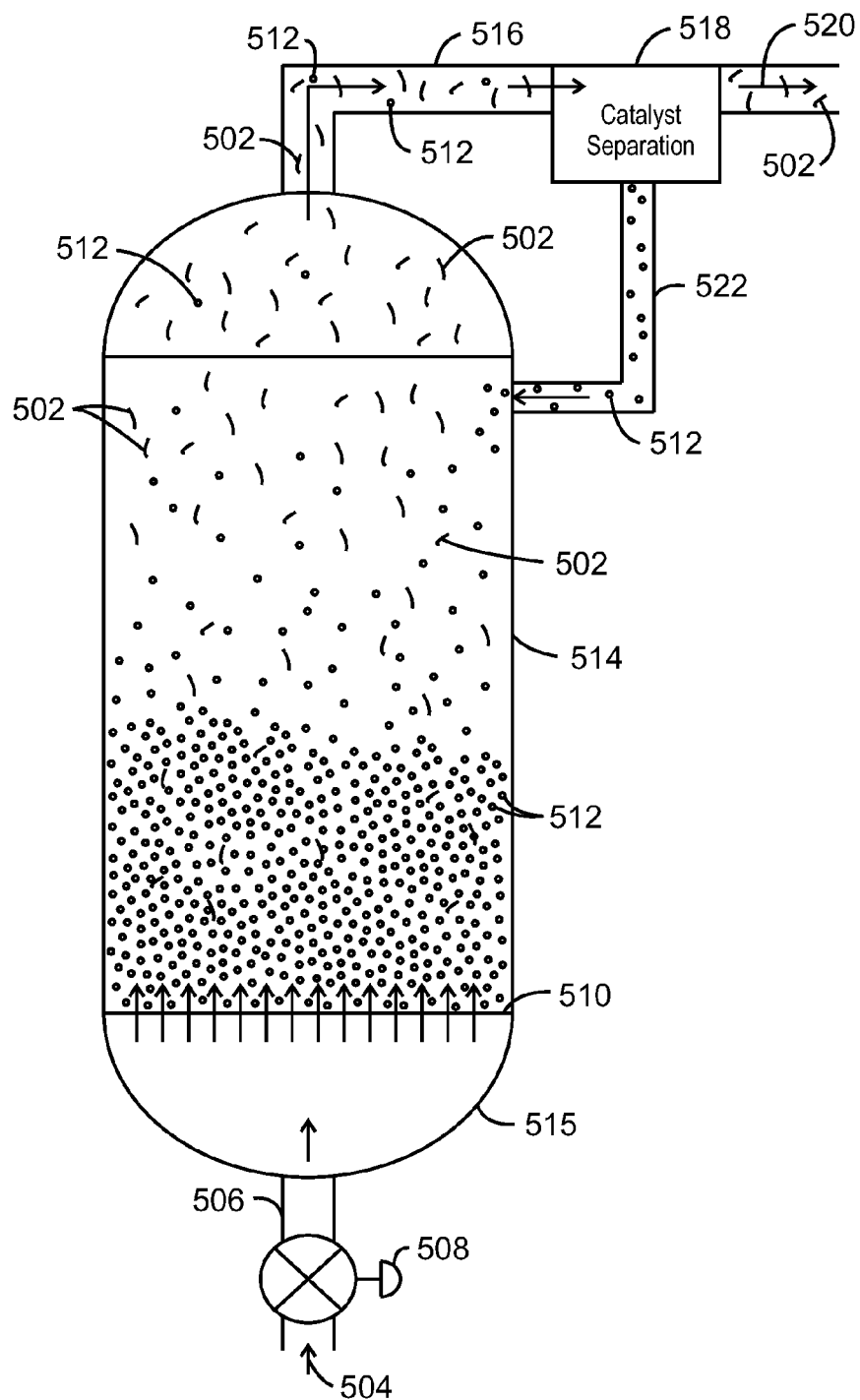
FIG. 5 is a drawing of a fluidized bed reactor for forming carbon allotropes, such as carbon nanotubes.

FIG. 5 is a drawing of a fluidized bed reactor 500 for forming carbon allotropes, such as carbon nanotubes 502. A hot gas feed stream 504 is fed through a line 506 into the bottom of the fluidized bed reactor 500. A control valve 508 may be used to regulate the flow of the hot gas feed stream 504 into the reactor. The hot gas feed stream 504 flows through a distributor plate 510 and will fluidize a bed of catalyst beads 512 held in place by the reactor walls 514. As used herein, "fluidize" means that the catalyst beads 512 will flow around each other to let gas bubbles through, providing a fluid-like flow behavior. As discussed herein, the reaction conditions are very harsh to any exposed metal surface, as the metal surface will perform as a catalyst for the reaction. Thus, the reaction will result in the slow degradation of an exposed metal surface. Accordingly, the interior surface of the reactor, including the reactor walls 514 and heads 515, as well as the distributor plate 510, and other parts, can be made of a protective material, such as a ceramic or gold, to protect the surfaces.

As the hot gas feed stream 504 flows through the fluidized bed of catalyst particles 512, CNTs 502 will form from catalyst beads 512. The flowing hot gas feed stream 504 carries the CNTs 502 into an overhead line 516 where they are removed from the reactor 500. Depending on the flow rate, for example, as adjusted by the control valve 508, some amount of catalyst beads 512, or particles fragmented from the catalyst beads 512, may be carried into the overhead line 516. Accordingly, a catalyst separator 518 may be used to separate catalyst beads 512, and larger particles, from a reactor effluent stream 520 and return them to the reactor 500 through a recycle line 522. Any number of configurations may be used for the catalyst separator 518, including a cyclonic separator, a settling tank, a hopper, and the like. The reactions that take place in the fluidized bed are discussed in more detail in FIG. 6.

Figure 6:
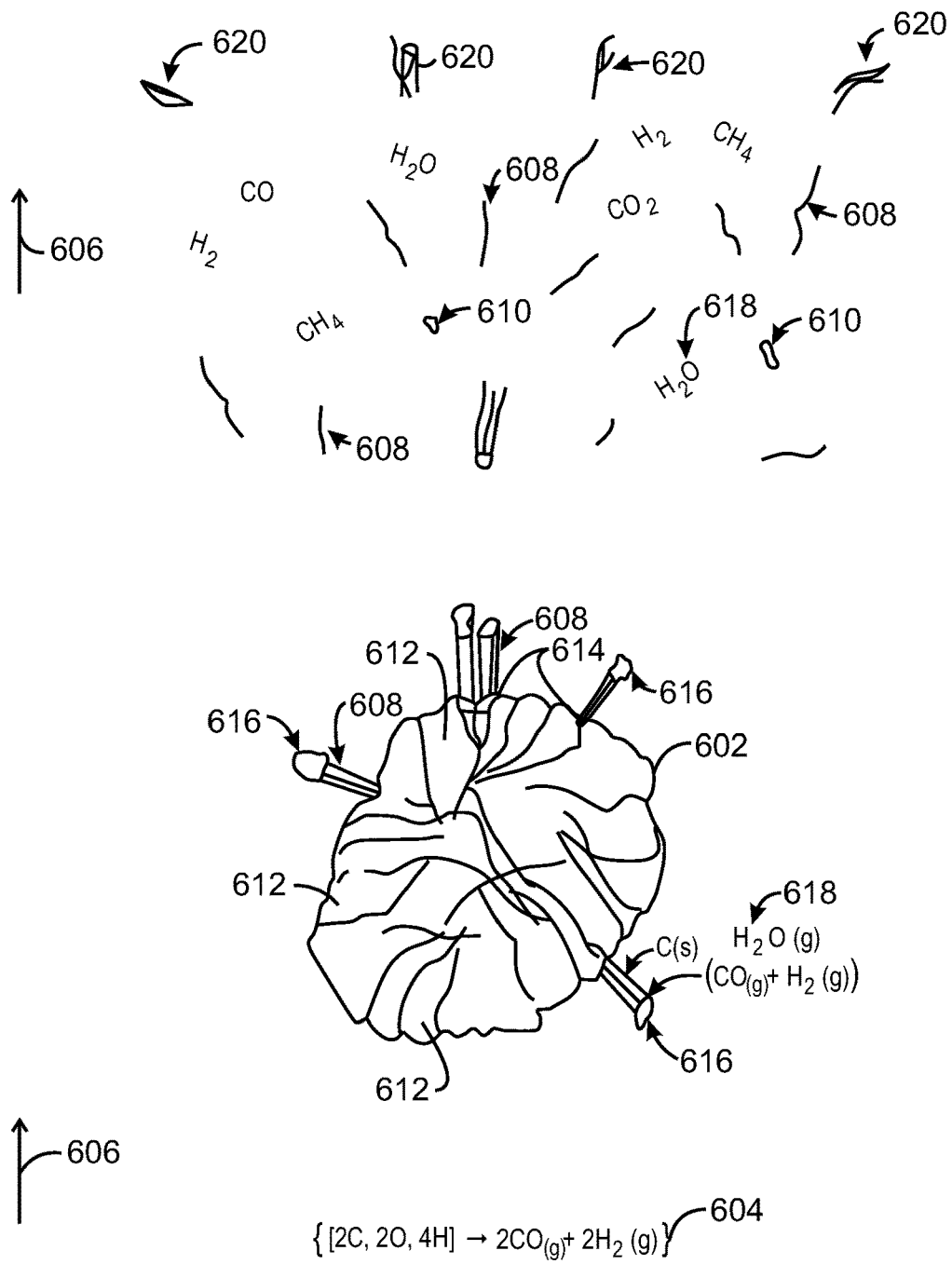
FIG. 6 is a schematic of a catalytic reaction for the formation of carbon allotropes, such as carbon nanotubes (CNTs), on a catalyst bead.

FIG. 6 is a schematic of a catalytic reaction 600 for the formation of carbon allotropes, such as carbon nanotubes (CNTs), on a catalyst bead 602. An initial reaction 604 in a portion of the hot gas feed stream 606, for example, in a $CO_2$ and $CH_4$ mixture, results in the formation of CO and $H_2$ in stoichiometric amounts. Excess amounts of the source gases 606 continue to flow through the reactor, helping to fluidize the bed and carrying away CNTs 608 and catalyst particles 610.

The reactions that form the CNTs 608 take place on the catalyst bead 602. The size of the CNTs 608, and the type of CNTs 608, e.g., single wall or multiwall CNTs 608, may be controlled by the size of the grains 612. Without being limited by theory, a nucleus of iron atoms of sufficient size at the grain boundary may form a nucleating point for the growth of the carbon products on the catalyst bead 602. Generally, smaller grains 612 may result in fewer layers in the CNTs 608, and may be used to obtain single wall CNTs 608. Other parameters may be used to affect the morphology of the final product as well, including reaction temperature, pressure, and feed gas flow rates.

The CO and $H_2$ react at grain boundaries 614, lifting active catalyst particles 616 off the catalyst bead 602, and forming $H_2O$ 618 and the solid carbon of the CNTs 608. The CNTs 608 break off from the catalyst bead 602 and from the catalyst particle 610. Larger catalyst particles 610 can be captured and returned to the reactor, for example, by the catalyst separator 518 discussed with respect to FIG. 5, while very fine catalyst particles 610 will be carried out with the CNTs 608. The final product will include about 70 mol % solid carbon and about 15 mol % metal, about 80 mol % solid carbon and about 10 mol % metal, about 90 mol % solid carbon and about 7 mol % metal, or about 95 mol % solid carbon and about 5 mol % metal. The CNTs 608 will often agglomerate to form clusters 620, which are the common form of the final product. Some amount of the CO and $H_2$ passes through the reactor without reacting and are contaminants in the reactor effluent streams.

As the reaction proceeds, the catalyst bead 602 is degraded and finally consumed. Accordingly, the reaction may be described as a metal dusting reaction. In some embodiments, metal surfaces are protected from attack by a protective lining, such as a ceramic or gold, since the metal surfaces in contact with the reaction conditions would not only degrade, but may also result in the formation of poorer quality products.

The catalyst bead 602 can include any number of metals from different IUPAC Groups on the periodic table, such as Group 10 (e.g., nickel), Group 8 (e.g., iron or ruthenium), Group 9 (e.g., cobalt), or Group 6 (e.g., chromium or molybdenum), among others. Other metals that may be present include Group 7 metals (e.g., manganese), or Group 5 metals (e.g., cobalt), among others. It can be understood that the metals listed above are merely exemplary of the Groups mentioned and other metals from those Groups may be included. However, the catalytic sites on the catalyst beads 602 may be principally composed of iron atoms. In one embodiment, the catalyst bead 602 includes metal shot, for example, about 25-50 mesh metal beads that are used for shot blasting. In one embodiment, the catalyst may be a stainless ball bearing, and the like.

Method

Figure 7:
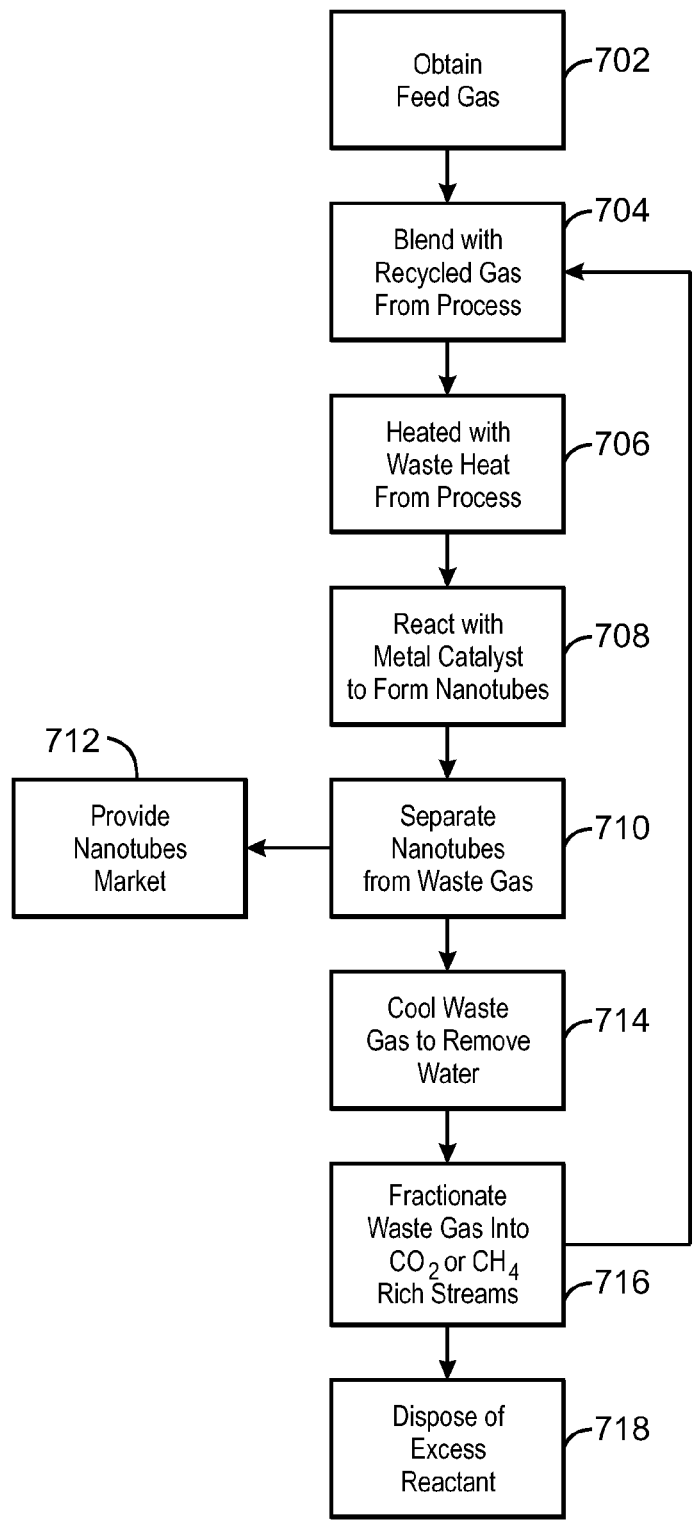
FIG. 7 is a method for generating carbon nanotubes from a feed gas that includes methane and carbon dioxide.

FIG. 7 is a method 700 for generating carbon nanotubes from a feed gas that includes methane and carbon dioxide. The method 700 begins at block 702, at which a mixed $CO_2/CH_4$ feedstock is obtained. The feedstock may be obtained from any number of sources. As mentioned, the feedstock may include a natural gas harvested from a sub-surface reservoir, an exhaust gas from a power generation plant, or any number of other gases from hydrocarbon reservoirs, carbonaceous materials, or plant sources. Further, other feedstocks may be used in embodiments, including other materials, such as syngas, CO, $H_2$, other hydrocarbons, and the like.

At block 704, the feedstock is combined with a recycle gas obtained from the wastes gases generated in the process. As described herein, the recycle gas may be obtained from the waste gases by cryogenic gas fractionation, as well as any number of other techniques. At block 706, the combined gas stream is heated with waste heat recovered from the reaction process. After heating, at block 708, the combined gas stream is reacted with a metal catalyst in a reactor to form the CNTs. At block 710 the CNTs are separated from the waste gas. At block 712, the separated CNTs are purged, cooled, and packaged to be sent to market.

The waste gas is cooled to remove excess water formed during the reaction. As the process is conducted at high temperatures and pressures, an ambient temperature heat exchanger provides sufficient cooling to condense out the water vapor. The processes described at blocks 706-714 will be repeated for each sequential reactor in the reaction system.

At block 716, the waste gas is fractionated into a CO2 enriched stream and a CH4 enriched stream. At block 718, whichever stream contains the excess reagent can be sold, while the other stream can be recycled to block 704 to be used in the process.

EXAMPLES

A technique to determine the compositions, temperatures, and pressures of reactants that give carbon allotropes, such as carbon nanotubes (CNTs) has been developed. It uses carbon activity produced by equilibrium considerations of three reactions as a guide to the range of reactor conversion that will produce carbon in the C—H—O system. As a system of components made up of carbon, hydrogen, and oxygen reacts at high temperature, low molecular weight gases are produced, which can catalytically react to form carbon allotropes. The technique reduces a large number of potential experiments to a single variable, carbon activity. Using thermodynamics, the carbon activity can be calculated for any reactive gas mixture and then used with a carbon forming reaction to identify the conditions were carbon formation takes place. In some cases, the oxidation of the catalyst will terminate the carbon forming reaction even though the activity indicates it should still be occurring.

Figure 8:
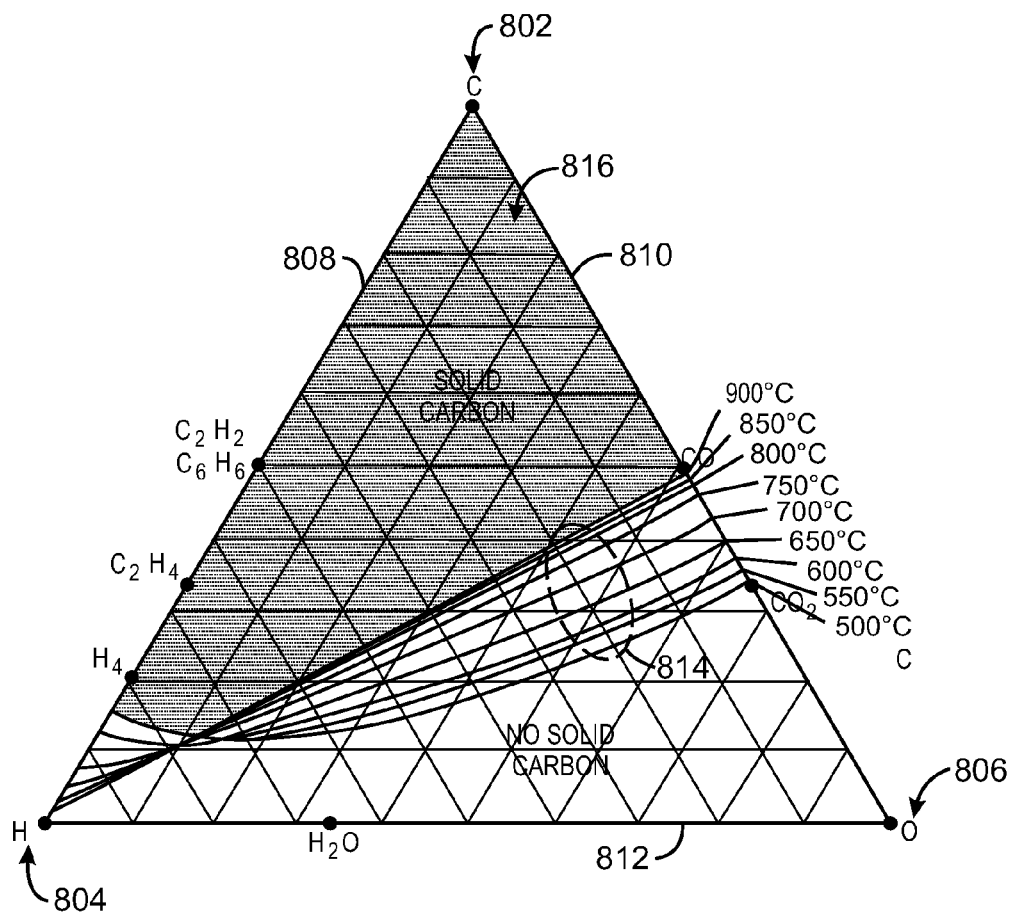
FIG. 8 is an equilibrium diagram that identifies conditions under which a solid carbon product will form.

FIG. 8 is an equilibrium diagram that identifies conditions under which a solid carbon product will form. This diagram is a triangular diagram 800 with the elements, C 802, H 804, and O 806, at the apexes of the equilateral triangle. As one moves from any location towards an apex the molar ratio of the element, C 802, H 804, and O 806, at the apex increases. In this way all of the possible compositions of the three elements can be mapped onto the triangular diagram 800.

Any chemical compound, or mixture, with any two or all these three elements can be mapped onto the triangular diagram 800 as is indicated by the various points marked. Some of the chemical compounds are hydrocarbons including alkanes, alkenes and alkynes as well as many other types of hydrocarbons. The hydrocarbons are located on the base

808 connecting C 802 and H 804. Chemical compounds that include only the elements C 802 and O 806, including carbon monoxide and carbon dioxide, occur along the base 810 connecting C 802 and O 806. Chemical compounds that include only the elements H 804 and O 806, such as water ($H_2O$), occur along the base 812 connecting H 804 and O 806.

In the central region of the triangular diagram 800 are chemical compounds and mixtures that have all three elements, C 802, H 804, and O 806. For example, these chemical compounds may include a very large number of individual components, such as alcohols, aldehydes, ethers, and materials with more complex structures, such as carbohydrates. Further, mixtures of compounds such as hydrogen, carbon oxides, and hydrocarbons may also be present.

Some of the first experiments to form fullerenes, $C_{60}$ and $C_{70}$, as well as carbon nanotubes (CNTs) were performed by laser ablation of a carbon electrode, capturing the carbon material in a mass spectrometer. The curves 814 shown in FIG. 8 show the limit of carbon production at various temperatures. The curves 814 were determined by performing a stoichiometrically constrained Gibbs minimization, which minimizes the Gibbs free energy of the resulting compounds based on the constraint that the amount of carbon, oxygen, and hydrogen are to be the same both before and after the reaction. The point where solid carbon formation occurs for the first time was noted as the composition was moved from a first composition point to a second composition point on the triangular diagram 800.

In thermodynamic terms, the curves 814 identify the points where the activity of carbon is about 1.0. Above a carbon activity of about 1.0, solid carbon forms, in the center region 816, while below the carbon activity of about 1.0, no solid carbon forms, as shown in the lighter region 818. The triangle diagram 800 is useful for identifying the conditions where carbon allotropes, such as carbon nanotubes (CNTs) can possibly be produced, as well as determining compounds and mixtures that can be used for their production.

At the temperatures indicated in FIG. 8, most hydrocarbons, and other organic compounds, undergo thermal decomposition to produce small, thermodynamically stable, gas molecules, such as CO, $CO_2$, $CH_4$, $H_2O$, $H_2$, and the like. Under certain reaction conditions, these small gas molecules can react to produce carbon allotropes. In some cases, the carbon allotropes will be in the form of CNTs. Both single walled and multi-walled CNTs of various dimensions and chiralities can be made in these ways.

Reaction Pathways for the Formation of Carbon Allotropes

Hydrocarbons undergo thermal decomposition in two ways, depending upon the concentration of oxygen. Without oxygen being present, large hydrocarbon molecules will thermally decompose into smaller hydrocarbons, such as methane, ethane, propane, and hydrogen. These small hydrocarbons will further decompose to carbon and more hydrogen giving an overall reaction as shown in Rxn. 1. This reaction, termed a pyrolysis reaction, occurs along the base 808 connecting C 802 and H 804.

$$C_nH_{2m} \leftrightarrow nC + mH_2 \qquad \text{Rxn. 1}$$

A representative case is the thermal decomposition of methane, shown in Rxn. 2.

$$CH_4 \leftrightarrow C + 2H_2 \qquad \text{Rxn. 2}$$

In the presence of a low amount of oxygen, hydrocarbons will react to form carbon monoxide and carbon dioxide and water as well as carbon allotropes and hydrogen according to the reaction shown in Rxn. 3. This reaction is termed the Bosch reaction, and occurs in the center region of the triangular diagram 800.

$$C_nH_{2m} + qO_2 \leftrightarrow qCO + qH_2O + (n-q)C + (m-q)H_2 \qquad \text{Rxn. 3}$$

The ratio of CO to $H_2O$ after reaction may differ depending upon the temperature of the system. Further, depending upon the amount of oxygen there may be some carbon dioxide in the product gases. Any carbon monoxide or carbon dioxide produced may react to form carbon allotropes at the high temperature conditions. Higher concentrations of $O_2$ typically result in higher temperatures, due to combustion, resulting in the production of more CO and $CO_2$ and less solid carbon and hydrogen. Thus, the reaction system typically restricts the amount of oxygen present in the system in order to produce larger amounts of carbon allotropes.

Organic compounds that include small amounts of oxygen in them may also be useful in the production of carbon allotropes. These compounds thermally decompose to form small, thermodynamically stable, gas molecules that can further react on a catalyst surface to produce carbon allotropes and water according to the overall reaction shown in Rxn. 4, which is another example of the Bosch reaction.

$$C_nH_{2m}O_q \leftrightarrow nC + qH_2O + (m-q)H_2 \qquad \text{Rxn. 4}$$

Any carbon monoxide or carbon dioxide produced has a tendency to react to carbon at these high-temperature conditions, adding to the overall productivity. These reactions form the simplest embodiments of the Bosch reaction, shown in Rxn. 5.

$$CO_2 + 2H_2 \leftrightarrow C + 2H_2O \qquad \text{Rxn. 5}$$

The Bosch reaction can be mechanistically written as two separate reactions in which CO is produced as an intermediate, as shown in Rxns. 6 and 7.

$$CO_2 + H_2 \leftrightarrow C + H_2O \qquad \text{Rxn 6}$$

$$CO + H_2 \leftrightarrow C + H_2O \qquad \text{Rxn. 7}$$

The first, Rxn 6, is fast and tends toward equilibrium. The second, Rxn. 7, is slow. Another reaction that can produce carbon allotropes is the Boudouard reaction that is shown in Rxn. 8. The Boudouard reaction takes place on the base 810 between C 802 and O 806, and produces carbon allotropes and carbon dioxide from carbon monoxide.

$$2CO \leftrightarrow C + CO_2 \qquad \text{Rxn. 8}$$

In addition to forming small molecules directly in the reactor, a number of other approaches may be used to provide the reactants to form the carbon allotropes. For example, steam reforming of hydrocarbons and other organic chemicals may be used. In these reactions, shown in Rxns. 9 and 10, a mixture of CO and hydrogen, called syngas, is formed.

$$C_nH_{2m} + nH_2O \leftrightarrow nCO + (m+n)H_2 \qquad \text{Rxn. 9}$$

$$C_nH_{2m}O_q + (n-q)H_2O \leftrightarrow nCO + (m+n-q)H_2 \qquad \text{Rxn. 10}$$

At the reaction temperatures shown in the triangular diagram 800, the syngas forms carbon allotropes via the second step of the Bosch reaction mechanism, shown in Rxn. 7.

As is apparent in the reactions shown above, there is a multitude of starting points for the production of carbon allotropes, such as CNTs. However, the reactions can be simplified by focusing on the conversion of the feedstock compounds into a mixture of small, thermodynamically stable, gases. These gases can then react to form carbon allotropes in the presence of a catalyst. This simplification can be performed by noting that a given hydrocarbon reacting with oxygen or with steam will be converted to carbon monoxide, carbon dioxide, water vapor, and hydrogen. Similarly, a given oxygenate reacting with itself, or with oxygen or steam, will also be converted to carbon monoxide, carbon dioxide, water vapor, and hydrogen. The ultimate mixture of small thermodynamically stable gases can be determined by performing equilibrium calculations on the reactions described above.

The gas mixture can then be converted to carbon allotropes in the Boudouard Reaction shown in Rxn. 8, step two of the Bosch reaction shown in Rxn. 7, the methane pyrolysis reaction shown in Rxn. 2, or some combinations of these. As all of these reactions produce carbon allotropes, they may be used to predict the carbon activity as a function of the composition of carbon monoxide, carbon dioxide, hydrogen, water vapor, methane, etc., produced by some previous thermal decomposition reaction.

Activity of Carbon

The activity of carbon, $A_c$, is determined from the reaction equilibrium constants using a number of equations, depending on the reaction. For the Boudouard Reaction shown in Rxn. 8, the activity can be determined using the formula shown in Eqn. 1.

$$A_c = K_2 P_T (Y_{CO}^2 / Y_{CO_2}) \qquad \text{Eqn. 1}$$

For the second step of the Bosch Reaction shown in Rxn. 7, the carbon activity can be predicted using the formula shown in Eqn. 2.

$$A_c = K_1 (Y_{H_2O} / (Y_{CO} * Y_{H_2})) / P_T \qquad \text{Eqn. 2}$$

The carbon activity for the methane pyrolysis reaction shown in Rxn. 2, can be predicted using the formula shown in Eqn. 3.

$$A_c = K_3 (Y_{CH_4} / Y_{H_2}^2) / P_T \qquad \text{Eqn. 3}$$

In Eqns. 1-3, $Y_i$ is the mole fraction of the gas "i", and $P_T$ is the total system pressure in atmospheres (atm) assuming that the ratio of fugacity coefficients is 1.0. When $P_T$ is about 1 atm, the effect of pressure disappears as the gas is ideal. At these temperatures and low pressure, for example, less than about 10 atm, the assumption that the gas phase is ideal is a reasonable one. When the pressure is higher than about 10 atmospheres (atm) than the mole fraction of gas i must be replaced by the fugacity of gas i in the above equations for the carbon activity. It can also be noted that the effect of pressure is different for the reactions. Increasing pressure increases $A_c$ for the Boudouard reaction while increasing pressure decreases $A_c$ for both the methane pyrolysis reaction and the second step of the Bosch reaction.

The three fundamental reactions to produce carbon correspond to how compounds listed in the triangular diagram 800 react. The methane pyrolysis reaction is typical of the carbon producing reaction of any hydrocarbon that is found on the base 808 between C 802 and H 804. It can also be noted that temperature lines 814 invert near H 804, because pyrolysis reactions in general, and the methane pyrolysis in particular, are endothermic reactions. By comparison, the Boudouard reaction and the second step of the Bosch reactions are exothermic reactions. The Boudouard reaction is typical of any carbon producing reaction that takes place with on the base 810 between C 802 and O 806. The second step of the Bosch reaction is typical of the carbon producing reaction that takes place anywhere in the central portion 816 of the triangle diagram 800.

The carbon activity (Ac) that is described herein as a means to produce carbon allotropes is challenging to vessels that can be used as a reactor. Metal dusting corrosion is an important corrosion mechanism for low alloy steels in strongly reducing gases at the temperatures of interest to this work. With metal dusting corrosion, carbon allotropes are formed from metal surfaces, and take a small amount of base metal for each portion. In some cases, the metal dusting creates pits, which can lead to catastrophic metal failure through one of these pinholes in a short period of time. Metal dusting corrosion can be overcome by choosing materials of construction with high "equivalent chromium" content. Equivalent chromium is the sum of the percentages of all metals that are more oxidation resistant than chromium in the alloy.

Oxidation Poisoning of Metal Catalysts

Another aspect of the catalytic reaction to produce carbon allotropes is that certain gas compositions and temperatures will oxidize the metal catalyst used in the reaction, rendering it ineffective for further catalytic reaction, as shown in Rxn. 11. The point where oxygen causes a metal or alloy to oxidize depends upon its properties. For elemental metals this is determined by the Gibbs free energy of formation of the oxide.

$$xM + yO_2 \leftrightarrow M_xO_{2y} \qquad \text{Rxn. 11}$$

If iron is used as a catalyst, there are various oxides that may be formed. The most common include Wüstite (FeO), magnetite ($Fe_3O_4$), and hematite ($Fe_2O_3$). Wüstite is thermodynamically favored at these temperatures and pressures and forms by the reaction shown in Rxn. 12.

$$Fe + \tfrac{1}{2}O_2 \leftrightarrow FeO \qquad \text{Rxn. 12}$$

An equilibrium constant, $K_{FeO}$, for Rxn 12 can be determined by the formula shown in Eqn. 4.

$$K_{FeO} = \exp[-\Delta G_{FeO}/(R_g T)] = [P_{O_2}/P_T]^{-1/2} \qquad \text{Eqn. 4}$$

In Eqn. 4, $\Delta G_{FEO}$ is the Gibbs free energy of iron oxidation to Wüstite which is a function of temperature, $R_g$ is the gas constant, T is the absolute temperature, $P_{O2}$ is the partial pressure of oxygen ($O_2$), and $P_T$ is the total pressure of the system. The ratio, $P_{O2}/P_T$, is simply the mole fraction of $O_2$ in the system. Using this equation, the partial pressure of oxygen that will initiate the oxidation of iron at any temperature can be identified.

The partial pressure of oxygen can be obtained from one of the fast reaction equilibria presented in Eqns. 5 and 6.

$$H_2O \leftrightarrow H_2 + \tfrac{1}{2}O_2, \; P_{O2} = P_T \sqrt{K_{H2O} \frac{Y_{H2O}}{Y_{H2}}} \qquad \text{Eqn. 5}$$

$$CO_2 \leftrightarrow CO + \tfrac{1}{2}O_2, \; P_{O2} = P_T \sqrt{K_{CO2} \frac{Y_{CO2}}{Y_{CO}}} \qquad \text{Eqn. 6}$$

In these equilibria calculations, K is the equilibrium constant, a function of temperature, for the decomposition of gas i. As shown by Eqns. 5 and 6, the partial pressure of oxygen is controlled by either the mole fraction ratio of water vapor to hydrogen or the mole fraction ratio of carbon dioxide to carbon monoxide at a given temperature.

As shown in Eqns. 1-6, the mole fraction ratios are important in the determination of the partial pressure of oxygen and in the definition of carbon activity for the Boudouard and Bosch reaction mechanisms. For example, the mole fraction ratio sets both the carbon activity and the partial pressure of oxygen, so that there will be a given activity of carbon that will initiate the oxidation of the metal catalyst.

Examples of Carbon Activity Calculations

Figure 9:
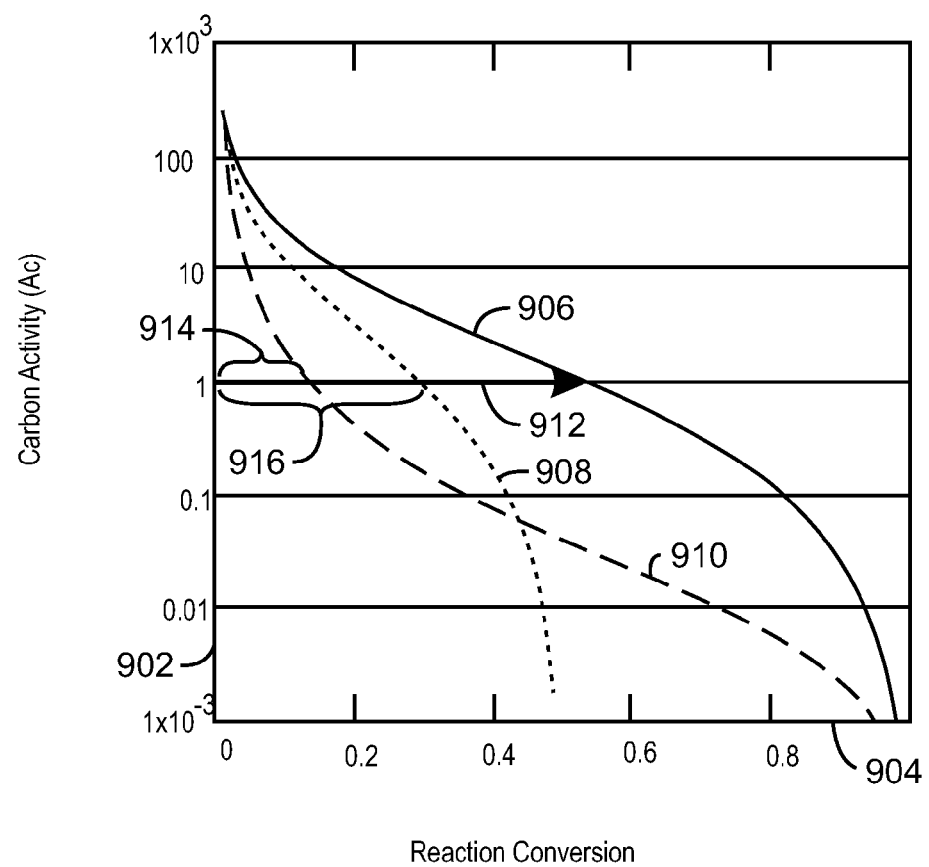
FIG. 9 is a plot of the carbon activities (Ac) at about 973.15 K (about 700° C.)
Figure 10:
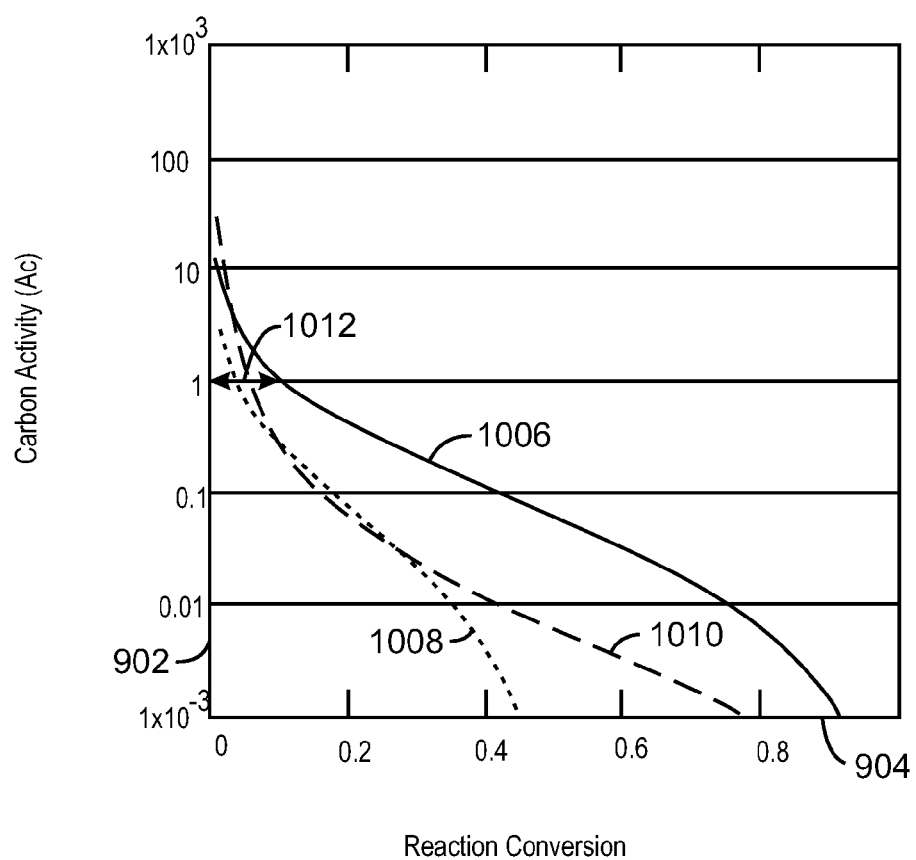
FIG. 10 is a plot of the carbon activities (Ac) at about 1173.15 K (about 900° C.)

FIGS. 9 and 10 compare the Ac for the different reactions that form carbon allotropes at about 973.15 K (about 700° C.) and about 1173.15 K (about 900° C.), respectively. In both figures, the Bosch second step reaction assumes that a 50:50 mix of CO and $H_2$ undergoes reaction to form carbon as you move along the x-axis. Any oxygenated compound that reacts in the central part of the triangle diagram 800, shown in FIG. 8, can generate a starting reaction mixture by a fast equilibrium reaction that includes the Bosch reaction or the methane-carbon dioxide reaction. In FIGS. 9 and 10, the Boudouard reaction starts with 100% CO initially at zero reaction conversion. Similarly, the methane pyrolysis reaction starts with 100% methane initially at zero reaction conversion. Again these three reactions are typical of the C—H base 808 and C—O base 810 and the central section 816 of the triangle diagram 800, respectively.

FIG. 9 is a plot 900 of the carbon activities (Ac) at about 973.15 K (about 700° C.). The y-axis 902 represents the log value of the Ac, while the x-axis 904 represents the reaction conversion. In this plot 900, the Ac is shown for the second step of the Bosch reaction 906, the Boudouard reaction 908, and the methane pyrolysis reaction 910. For simplification, the pressure of the system is at about one atmosphere. In each reaction, at low reaction conversion there is a high Ac 902, e.g., near a value of about 100. This initial Ac can be altered by the initial composition of gases. For example, if there is more hydrogen, carbon monoxide, or another reducing gas present, such as methane, then a higher initial Ac is achieved and the whole carbon activity curve is lifted vertically. As the reaction conversion 904 increases, the Ac decreases to values below about 1.0 indicating that carbon allotropes will not continue to form. As reaction conversion proceeds to completion very low levels of carbon activity are observed. As a result, as shown in FIG. 9 for about 973.15 K (about 700° C.), there is a window 912 of reaction conversion from zero to a value from about 0.1 to about 0.6, depending upon the reaction, where carbon allotropes are formed.

As shown in FIG. 9, the methane pyrolysis reaction 910 has the narrowest window 914, the Boudouard reaction 908 has the next widest window 616, and the Bosch reaction 906 has the widest window 912. This gives clear advantages to the Bosch reaction 906, which gives a mixture of CO and $H_2$ after initial reaction equilibria have been established. This corresponds to the center region 816 of the triangular diagram 800 of FIG. 8.

FIG. 10 is a plot 1000 of the carbon activities (Ac) at about 1173.15 K (about 900° C.). Like numbered items are as discussed with respect to FIG. 9. In this plot 1000, the Ac is shown for the second step of the Bosch reaction 1006, the Boudouard reaction 1008, and the methane pyrolysis reaction 1010. As in the previous system, the pressure of the system is at about one atmosphere system pressure.

As shown in FIG. 10, the reactivity window 1012 for the formation of solid carbon allotropes is restricted to less than a reaction conversion of about 0.1 at about 1173.15 K (about 900° C.). However, the Bosch reaction still shows the widest window for the conversion.

Since the initial value of the Ac, at zero reaction conversion, is indicative of the driving force for the carbon forming reaction, it will dictate the rate of carbon formation. Fast rates of carbon formation, as indicated by high initial Ac values, may form amorphous carbon while lower carbon activities will lead to lower rates of formation that are more likely to form multi- and single-walled carbon nanotubes.

Thus, a reactor can be designed to be operated over a range of reaction conversions from zero to a fixed value within the window for that particular reaction. Depending upon the reactant mixture and the reaction temperature, there is a given reaction conversion window that the reactor can be designed for, in order to get the most carbon out of the reactor without its conversion into gaseous waste products. Turning to the limits placed on these systems by the oxidation of iron catalyst, the partial pressure of oxygen in the gas mixture of the system can be calculated and compared to the partial pressure of oxygen that will transform iron to Wüstite.

Figure 11:
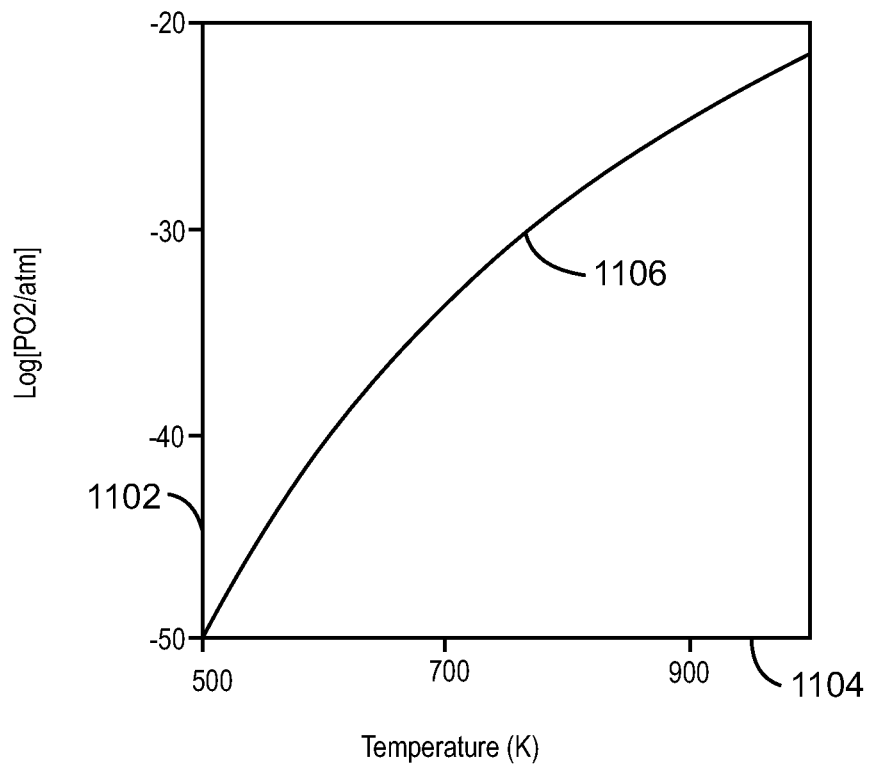
FIG. 11 is a plot of the oxygen partial pressure at which iron transforms to Wüstite, as a function of temperature.

FIG. 11 is a plot of the oxygen partial pressure at which iron transforms to Wüstite, as a function of temperature. The y-axis 1102 represents a log of the partial pressure of oxygen in the system, while the Y-axis 1104 represents the temperature in Kelvin. As shown in FIG. 11, the oxygen partial pressure 1106 for the conversion of iron to Wüstite is very low, below about $10^{-20}$ atm, for all temperatures of interest. As the temperature increases, the oxygen partial pressure associated with this transformation increases from about $10^{-50}$ atm to about $10^{-20}$ atm. Other metals have different catalytic activities and different oxygen partial pressures at which they transform to their oxides.

Figure 12:
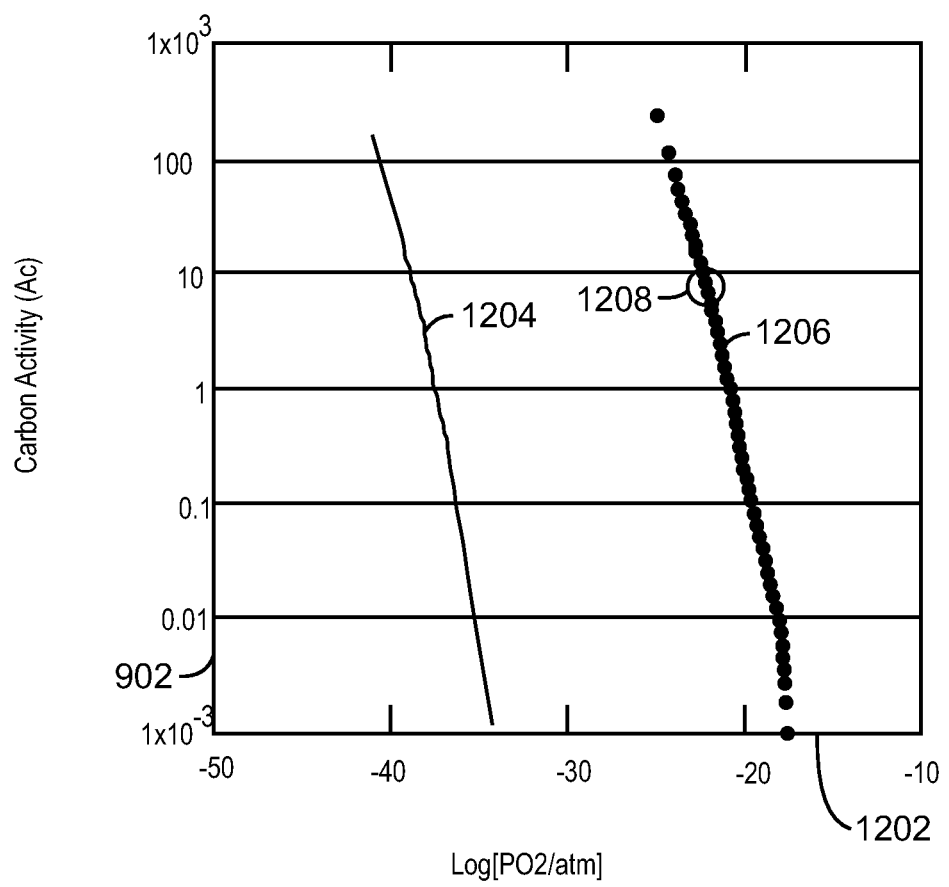
FIG. 12 is a plot of the calculated carbon activity (Ac) as a function of oxygen partial pressure.

FIG. 12 is a plot 1200 of the calculated carbon activity (Ac) as a function of oxygen partial pressure. Like numbered items are as described with respect to FIG. 9. The x-axis 1202 is the log of the partial pressure of oxygen in the system. The plot 1200 shows the linkage between the Ac, which is determined by the ratio of mole fractions in the gas mixture, and the partial pressure of oxygen, which is determined by a slightly different ratio of mole fractions in the gas mixture. The Boudouard reaction is shown as curve 1204 and the Bosch reaction is shown as curve 1206. Also shown in the plat 1200 is a point corresponding to the partial pressure of oxygen at the point 1208 where Wüstite is formed. This point 1208 is at a partial pressure of about $10^{-22.4}$ atm at about 973.15 K (about 700° C.), and a carbon activity of about 8.

For the Bosch reaction curve 1206, the point 1208 at which iron oxidation occurs shrinks the carbon activity range from between about 250 to 1.0 to about 250 to 8 at about 973.15 K (about 700° C.). Referring back to FIG. 9, the reaction conversion window 912 is further restricted to reaction conversions less than about 0.2 for the Bosch second step reaction, where it was about 0.6 without consideration of iron oxidation. Should the Bosch reaction second step be run with high ratio of $H_2$ to CO then the whole curve in FIG. 9 can be raised vertically making the carbon activity range increases from about 250 to 8 to greater than about 250 to 8. With this change, a similar increase in the reaction conversion window is made.

For the Boudouard reaction curve 1204, as the carbon activity decreases from a high point of 200, the oxygen partial pressure decreases from about $10^{-33}$ atm to about $10^{-41}$ atm. The iron-Wüstite point 1208, which occurs at an oxygen partial pressure of about $10^{-22.4}$ atm at about 973.15 K (700° C.) is not in the range of oxygen partial pressures produced by the Boudouard reaction for any reaction conversion. Thus, the oxidation of the iron catalyst will not occur when running the Boudouard reaction, and the range of carbon activities that can be used goes from about 200 to 1.0 at about 973.15 K.

Figure 13:
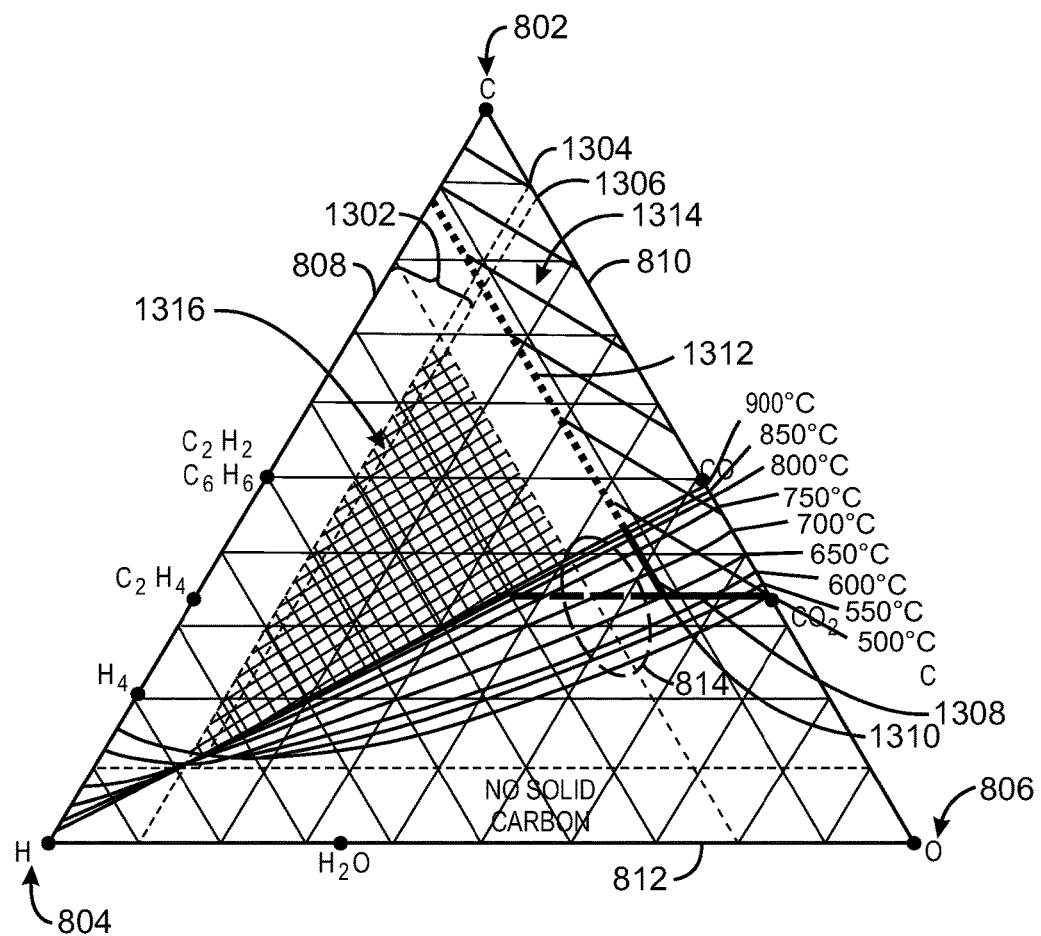
FIG. 13 is another triangle diagram showing a reaction region in which the Bosch reaction can be used to form solid carbon allotropes.

FIG. 13 is another triangle diagram 1300 showing a reaction region in which the Bosch reactions can be used to form solid carbon allotropes. Like numbered items are as described with respect to FIG. 8. This triangle diagram 1300 can be used to summarize the previous findings.

First, noting the fact that pyrolysis reactions are endothermic, their zone of influence is near the H 804 apex of the triangle diagram 1300, where the temperature lines curve, inverting the temperature sequence as the amount of carbon in the system increases. As a result, a zone 1302 near the C—H base 808 may be delineated in the triangle near the H apex where pyrolysis reactions dominate over the Bosch reactions. Because the transition point changes as the temperature of the system changes, two lines 1304 and 1306 can be used to indicate the edge of the zone 1302, depending on the temperature. The first line 1304 delineates the zone 1302 at about 1173.45 K (about 900° C.), while the second line 1306 delineates the zone 1304 at about 973.15 K (about 700° C.). The pyrolysis reactions dominate over the Bosch reactions in the zone to between the lines 1304 and 1306 and the CH base 808.

Further, from the Ac produced by both the Bosch second step and the Boudouard reactions, a zone near the C—O base 810 can be identified at which there is an equal probability for the first solid carbon allotropes to be produced by either reaction, based on the thermodynamics. One edge of this zone can be delineated by a first line 1308 in the triangle diagram 1300. Further, as discussed with respect to FIG. 12, there is a point 1208 at which the second step of the Bosch reaction generates sufficient water to cause the partial pressure of oxygen to be sufficiently high that the iron catalyst will oxidize to Wüstite. At this point 1310 the first line 1308 becomes dotted and a second line 1312 at a fixed hydrogen (H) content of about 0.14 for FeO, limits the Boudouard zone at about 1 atm system pressure. The Boudouard zone 1314 dominates over the Bosch reaction at reaction conditions above and to the right of the first line 1308 and to the right of the second line 1312 (FeO oxidation).

Conclusion

The calculations discussed with respect to FIGS. 8-13 identify carbon activity as the driving force for the production of carbon allotropes, such as CNTs. Thus, in embodiments described herein, various reaction mixtures in the C—H—O system can be reduced to a prediction of the carbon activity using three carbon forming reactions that are applicable on the C—H base 808, C—O base 810 and the central portion of the triangular diagram of the C—H—O system. Carbon activities larger than 1.0 produces carbon by each of the three carbon forming reactions. In some cases the carbon activity is a predictor of the transformation of iron to Wüstite, FeO. In these cases, the carbon activity where iron oxidizes will limit the carbon activity range where carbon can form to values larger than 1.0. In the case of the Bosch second step reaction with equimolar $CO:H_2$ feed at about 973.15 K (about 700° C.) the carbon activity is limited to values larger than about 35 for example.

Further, the calculations show delineated zones where pyrolysis (zone 1302) and Boudouard reactions (zone 1314) dominate on the C—H edge 808 and C—O edge 810, respectively, of the triangle diagram 1300. This also shows that experimental conditions in the central part of the triangular diagram of the C—H—O system define a Bosch reaction region 1316 that provides the largest reactor conversion resulting in faster production and higher yields than reactions on the C—H edge 808 or C—O edge 810 of the triangular diagram 1300. In this region, the concentration of the carbon is set by the Ac, and is greater than about 10%. Further, the oxygen content is greater than about 10%, and the hydrogen concentration is greater than about 20%.

Still other embodiments of the claimed subject matter may include any combinations of the elements listed in the following numbered paragraphs:

1. A method for forming carbon allotropes, including:
   forming a feedstock including at least about 10 mol % oxygen, at least about 10 mol % carbon, and at least about 20 mol % hydrogen;
   forming carbon allotropes from the feedstock in a reactor in a Bosch reaction at a temperature of at least about 500° C.; and
   separating the carbon allotropes from a reactor effluent stream.

2. The method of paragraph 1, including holding the temperature of the reactor to less than about 1000° C. during the Bosch reaction.

3. The method of paragraph 1, including holding the temperature between about 575° C. and 700° C.

4. The method of paragraphs 1, 2, or 3, including forming a forming a feedstock including at least about 20 mol % oxygen, at least about 20 mol % carbon, and at least about 40 mol % hydrogen.

5. The method of paragraphs 1, 2, or 3, including forming a forming a feedstock including at least about 15 mol % oxygen, at least about 15 mol % carbon, and at least about 60 mol % hydrogen.

6. The method of any of paragraphs 1-5, including adding steam to the feedstock.

7. The method of any of paragraphs 1-6, including forming the feedstock from a mixture including carbon dioxide and methane.

8. The method of any of paragraphs 1-7, including forming the feedstock from a mixture including carbon dioxide, carbon monoxide, hydrogen, and methane.

9. The method of any of paragraphs 1-8, including:
   analyzing the feedstock to determine the composition; and
   modifying the materials to control the ratio between the carbon, the hydrogen, and the oxygen.

10. The method of any of paragraphs 1-9, including generating the carbon allotropes at a yield of at least about 100 kg of carbon allotropes per 1 square meter of catalyst per hour.

11. The method of any of paragraphs 1-10, including using a mixture of carbon dioxide and methane as the feedstock.

12. The method of any of paragraphs 1-11, including removing water from the reactor effluent stream.

13. A system for the production of carbon allotropes, including:
   a feedstock including at least about 10 mol % oxygen, at least about 10 mol % carbon, and at least about 20 mol % hydrogen;
   a feed gas heater configured to heat the feedstock with waste heat from a waste gas stream;
   a reactor configured to form carbon allotropes from the feedstock in a Bosch reaction;
   a separator configured to separate the carbon allotropes from the reactor effluent stream forming the waste gas stream; and
   a water removal system, including an ambient temperature heat exchanger and separator configured to separate the bulk of the water from the waste gas stream to form a dry waste gas stream.

14. The system of paragraph 13, wherein the ambient temperature heat exchanger includes a water chiller.

15. The system of paragraphs 13 or 14, wherein the feedstock includes at least about 20 mol % oxygen, at least about 20 mol % carbon, and at least about 40 mol % hydrogen. 16. The system of paragraphs 13, 14, or 15, wherein the feedstock includes carbon dioxide and methane.

17. The system of any of paragraphs 13-16, wherein the feedstock includes carbon monoxide and hydrogen.

18. The system of any of paragraphs 13-17, wherein the ambient temperature heat exchanger includes an air cooled heat exchanger.

19. The system of any of paragraphs 13-18, including a package heater configured to heat the feedstock.

20. The system of any of paragraphs 13-19, including:
a compressor configured to increase the pressure of the dry waste gas stream; and
a water removal system configured to remove water from the dry waste gas stream.

21. The system of any of paragraphs 13-20, including a system configured to adjust the composition of the feedstock.

22. The system of paragraph 21, including a system configured to mix a methane rich stream, or a $CO_2$ rich stream, or both, with a recycle gas stream to form the feedstock.

23. The system of any of paragraphs 13-16, wherein the reactor is a fluidized bed reactor using a bottom fed flow of feedstock to fluidize a catalyst.

24. The system of paragraph 23, wherein the catalyst includes metal shot-blasting beads.

25. The system of any of paragraphs 13-24, including a gas fractionation system configured to separate a methane rich stream and a $CO_2$ rich stream from the waste gas stream.

26. The system of paragraph 25, including a mixing system configured to mix the methane rich stream into the feed gas before the feed gas heater.

27. The system of any of paragraphs 13-26, wherein the reactor is a fluidized bed reactor.

28. The system of paragraph 27, wherein the reactor is lined with a refractory material configured to prevent degradation of a metal shell.

29. The system of paragraph 27, wherein a piping connection between the reactor and a cross heat exchanger is lined with a refractory material configured to protect a metal surface from degradation.

30. The system of paragraph 27, including a separation system configured to remove catalyst particles from the reactor effluent stream and return the catalyst particles to the reactor.

31. A reaction system for forming carbon nanotubes, including:
two or more reactors configured to form carbon nanotubes from gas streams using a Bosch reaction, wherein a gas stream includes at least about 10 mol % oxygen, at least about 10 mol % carbon, and at least about 20 mol % hydrogen, wherein an effluent from each reactor, before a final reactor, is used as a feed stream for a downstream reactor, and wherein an effluent stream from the final reactor includes a reactant depleted waste stream;
a separation system downstream of each reactor, wherein the separation system is configured to remove carbon nanotubes from the effluent from the reactor;
a feed heater downstream of each separation system, wherein the feed heater includes a heat exchanger configured to heat a feed gas stream for a following reactor using waste heat from the effluent from the reactor, and wherein the feed heater downstream of the final reactor is configured to heat a gas stream for the first reactor;
an ambient temperature heat exchanger downstream of each feed heater, wherein the ambient temperature heat exchanger is configured to remove water from the effluent, forming the feed stream for the following reactor;
a compressor configured to increase the pressure of the reactant depleted waste stream;
an ambient temperature heat exchanger downstream of the compressor, configured to remove water from the reactant depleted waste stream;
a gas fractionation system configured to separate the reactant depleted waste stream into a methane enriched stream and a carbon dioxide enriched stream; and
a mixer configured to blend the methane enriched stream or the carbon dioxide enriched stream into an initial feed stream.

32. The reaction system of paragraph 31, including a package heater configured to heat an initial feed stream.

33. The reaction system of paragraph 32, wherein the package heater is used to heat a feed stream to a subsequent reactor.

34. The reaction system of paragraph 32, wherein the package heater is a heater configured to be field erected, or an electric power heater, a commercial heater configured for heating gases, or any combinations thereof.

35. The reaction system of paragraph 32, wherein the package heater is configured to heat a reducing gas stream without substantial damage.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for forming carbon allotropes, comprising:
forming a feedstock comprising at least about 10 mol % oxygen, at least about 10 mol % carbon, and at least about 20 mol % hydrogen;
forming carbon allotropes from the feedstock in a reactor in a Bosch reaction at a temperature of at least about 500° C.;
separating the carbon allotropes from a reactor effluent stream, forming a waste gas stream;
removing, via a heat exchanger, water from the waste gas stream to give a dry waste gas stream; and
compressing the dry waste gas stream and removing water from the dry waste gas stream.

2. The method of claim 1, comprising heating the feedstock with waste heat from the waste gas stream and holding the temperature of the reactor to less than about 1000° C. during the Bosch reaction.

3. The method of claim 1, comprising holding the temperature between about 575° C. and 700° C.

4. The method of claim 1, wherein forming a feedstock comprises forming a feedstock comprising at least about 20 mol % oxygen, at least about 20 mol % carbon, and at least about 40 mol % hydrogen.

5. The method of claim 1, wherein forming a feedstock comprises forming a feedstock comprising at least about 15 mol % oxygen, at least about 15 mol % carbon, and at least about 60 mol % hydrogen.

6. The method of claim 1, comprising adding steam to the feedstock.

7. The method of claim 1, comprising forming the feedstock from a mixture comprising carbon dioxide and methane.

8. The method of claim 1, comprising forming the feedstock from a mixture comprising carbon dioxide, carbon monoxide, hydrogen, and methane.

9. The method of claim 1, comprising:
analyzing the feedstock to determine a composition of the feedstock; and
modifying the feedstock to control a ratio between the carbon, the hydrogen, and the oxygen in the feedstock.

10. The method of claim 1, comprising generating the carbon allotropes at a yield of at least about 100 kg of carbon allotropes per 1 square meter of catalyst per hour.

11. The method of claim 1, wherein the feedstock comprises carbon dioxide and methane.

12. The method of claim 1, comprising processing, via a gas fractionation system, the dry waste stream to give a methane enriched stream and a carbon dioxide enriched stream.

13. The method of claim 12, comprising adding the methane enriched stream or the carbon dioxide enriched stream to the feedstock.

14. A method for production of carbon allotropes, comprising:
receiving a feedstock comprising at least about 10 mol % oxygen, at least about 10 mol % carbon, and at least about 20 mol % hydrogen;
heating, via a first heat exchanger, a feed gas comprising the feedstock with waste heat from a waste gas stream;
forming carbon allotropes from the feed gas in a Bosch reaction in a reactor;
separating the carbon allotropes from the reactor effluent, forming the waste gas stream;
removing, via a second heat exchanger, water from the waste gas stream to form a dry waste gas stream; and
compressing the dry waste gas stream and removing water from the dry waste gas stream.

15. The method of claim 14, forming carbon allotropes in quantities greater than about 0.5 kilogram per hour from the feed gas in the Bosch reaction in the reactor, wherein the feedstock comprises at least about 20 mol % oxygen, at least about 20 mol % carbon, and at least about 40 mol % hydrogen.

16. The method of claim 14, wherein the feedstock comprises carbon dioxide and methane.

17. The method of claim 14, wherein the feedstock comprises carbon monoxide and hydrogen gas.

18. The method of claim 14, comprising adjusting composition of the feedstock.

19. The method of claim 14, comprising mixing a recycle gas into the feed gas, the recycle gas comprising a methane rich stream or a $CO_2$ rich stream.

20. The method of claim 14, wherein the reactor comprises a fluidized bed reactor employing a bottom fed flow of feedstock to fluidize a catalyst.

21. The method of claim 20, wherein the catalyst comprises metal shot-blasting beads.

22. The method of claim 14, comprising separating a methane rich stream and a $CO_2$ rich stream from the dry waste gas stream.

23. The method of claim 22, comprising mixing the methane rich stream into the feed gas before the first heat exchanger.

24. The method of claim 14, discharging the reactor effluent from the reactor, wherein the reactor comprises a fluidized bed reactor.

25. The method of claim 14, comprising removing catalyst particles from the reactor effluent and returning the catalyst particles to the reactor.

26. The method of claim 14, wherein forming the carbon allotropes comprises generating in the reactor the carbon allotropes at a yield of at least about 100 kilograms of carbon allotropes per 1 square meter of catalyst per hour.

27. A method of producing carbon nanotubes, comprising:
receiving a feedstock comprising an element composition comprising at least about 10 mol % oxygen, at least about 10 mol % carbon, and at least about 20 mol % hydrogen;
blending a methane enriched stream or a carbon dioxide enriched stream into a feed gas comprising the feedstock;
reacting the feed gas with a catalyst in a Bosch reaction in a reactor to form carbon nanotubes;
removing the carbon nanotubes from an effluent discharged from the reactor, forming a waste gas stream;
removing, via a second heat exchanger, water from the waste gas stream to form a dry waste gas stream; and
compressing the dry waste gas stream and removing water from the dry waste gas stream.

28. The method of claim 27, comprising
separating, via a gas fractionation system, the methane enriched stream and the carbon dioxide enriched stream from the dry waste gas stream.

29. The method of claim 28, comprising:
increasing, via a compressor, pressure of the dry waste gas stream; and
removing, via a second heat exchanger, water from the dry waste gas stream.

30. The method of claim 27, comprising heating, via a heat exchanger, the feed gas with waste heat from the waste gas stream, wherein blending comprises blending the methane enriched stream or the carbon dioxide enriched stream into the feed gas upstream of the heat exchanger, wherein the blending is before the heating via the heat exchanger the feed gas with waste heat from the waste gas stream.

31. The method of claim 27, wherein reacting the feed gas with a catalyst in a Bosch reaction in a reactor to form carbon nanotubes comprises generating the carbon allotropes at a yield of at least about 100 kilograms of carbon allotropes per 1 square meter of catalyst per hour.

32. The method of claim 27, comprising reacting the feed gas with the catalyst in the Bosch reaction in the reactor to form carbon nanotubes in quantities greater than about 10 kilograms per hour.

33. The method of claim 27, wherein the feedstock comprises at least one of carbon dioxide, methane, carbon monoxide, or hydrogen gas, and wherein the feedstock comprises an element composition of at least about 20 mol % oxygen, at least about 20 mol % carbon, and at least about 40 mol % hydrogen.

* * * * *